US007162455B1

(12) United States Patent
Sugiyama

(10) Patent No.: US 7,162,455 B1
(45) Date of Patent: Jan. 9, 2007

(54) UNIQUE TIME GENERATING DEVICE AND AUTHENTICATING DEVICE USING THE SAME

(76) Inventor: Akira Sugiyama, Fujinokidaidanchi 27-102 1, sugesengoku 3-chome Tama-Ku, Kanagawa, 214 (JP)

( * ) Notice: Subject to any disclaimer, the term of this patent is extended or adjusted under 35 U.S.C. 154(b) by 0 days.

(21) Appl. No.: 09/194,051

(22) PCT Filed: Mar. 24, 1997

(86) PCT No.: PCT/JP97/00972

§ 371 (c)(1),
(2), (4) Date: Mar. 25, 1999

(87) PCT Pub. No.: WO98/43210

PCT Pub. Date: Oct. 1, 1998

(51) Int. Cl.
*G06Q 99/00* (2006.01)
*H04K 1/00* (2006.01)
*H04L 9/00* (2006.01)

(52) U.S. Cl. .......................... 705/67; 705/39; 705/64; 705/65; 705/66; 705/75; 705/77

(58) Field of Classification Search .................. 705/50, 705/51, 56, 64–67, 69, 75, 80, 39, 78
See application file for complete search history.

(56) References Cited

U.S. PATENT DOCUMENTS

| 5,444,780 A | 8/1995 | Hartman, Jr. ................. 380/30 |
| 5,453,601 A | 9/1995 | Rosen ......................... 235/379 |
| 5,502,765 A * | 3/1996 | Ishiguro et al. ............... 380/24 |
| 5,564,038 A | 10/1996 | Grantz et al. ............... 395/491 |

(Continued)

FOREIGN PATENT DOCUMENTS

JP 05143373 A * 6/1993

OTHER PUBLICATIONS

The Dictionary of Computer, Information Processing & Telecommunications, second edition, Jerry M. Rosenberg, Copyright 1984, 1987, p. 183.*

(Continued)

*Primary Examiner*—Calvin L. Hewit, II
(74) *Attorney, Agent, or Firm*—Rader, Fishman & Grauer PLLC

(57) ABSTRACT

In an authentication-data issuing system based on unique time, a master computer (1) creates authentication data on the basis of an elapsed time measurement indicated by an unique time generating device (6) and transmits the created authentication data to a lower-level computer (2A), which further delivers the authenticating data to a still-lower-level computer (3A). The lower-level computer and still-lower-level computer sequentially impart respective unique additional data to the authentication data and then transmits the resultant additional-data-imparted data to a lowest-level vending machine (5). The lowest-level vending machine (5) also imparts its unique additional data to the authentication data, received from the still-lower-level computer, to create unique authentication data and records the thus-created unique authentication data on a prepaid card (20) to be issued thereby. Simultaneously, the ultimately-created unique authentication data is sent from the vending machine, through the still-lower-level computer and lower-level computer, back to the master computer (1) for registration therein. When the thus-issued prepaid card (20) is used on a pachinko machine in a pachinko house under the control of the master computer (1), the pachinko machine reads the unique authentication data recorded on the card, and the thus-read data is collated with the data registered in the master computer (1) to ascertain the authenticity of the card.

39 Claims, 18 Drawing Sheets

U.S. PATENT DOCUMENTS 5,761,309 A * 6/1998 Ohashi et al. ............... 380/25
5,795,161 A    8/1998 Vogel ......................... 434/350
5,917,168 A * 6/1999 Nakamura et al. ............ 235/79
6,125,384 A * 9/2000 Bradt et al. ................. 709/203

OTHER PUBLICATIONS http://www.litronic.com/whitepaper/schistory.html, Copyright 1998.*

"Dallas Semiconductor turns on Internet commerce at the touch of a button; wearable computer chip generates uncrackable codes using public key cryptography", Business Wire, Oct. 7, 1996.*

* cited by examiner $$\text{ELAPSED TIME} = \frac{\text{ACCUMULATED TIME } Tn}{\text{TOTAL TIME VALUE } Tt} \bigg/ \frac{\text{TOTAL TIME VALUE } Tt}{\text{SUBTRACTED TIME}(Tt-Tn)}$$

ACCUMULATED TIME : (0 → TOTAL TIME VALUE)          SUBTRACTED TIME (TOTAL TIME VALUE → 0)

FIG. 9

ISSUANCE OF IDENTIFICATION DATA TO PACHINKO HOUSE A

| AUTHORIZED ISSUANCE | AUTHENTICATION DATA ISSUED FROM MASTER COMPUTER | ADDITIONAL AUTHENTICATION DATA BASED ON ELAPSED TIME MEASUREMENT BY COMPUTER 2A | AUTHENTICATION DATA TO BE ISSUED |
|---|---|---|---|
| 1,000 × 1,000-YEN PREPAID CARD | X1a | A1 ⋮ A1000 | X1a+A1 <br> X1a+A2 <br> X1a+A3 <br> ⋮ <br> X1a+A1000 |
| 100 × 5,000-YEN PREPAID CARD | X2a | B1 ⋮ B100 | X2a+B1 <br> X2a+B2 <br> X2a+B3 <br> ⋮ <br> X1a+B100 |
| 20 × 10,000-YEN PREPAID CARD | X3a | C1 ⋮ C20 | X3a+C1 <br> X3a+C2 <br> X3a+C3 <br> ⋮ <br> X3a+C20 |

FIG. 13

| 1,000-YEN CARD | | UNITS USED |
|---|---|---|
| ISSUE DATE | 3.26.2002 | |
| | 4. 1.2002 | 50 |
| | | REMAINING UNITS 50 |

— 28

US 7,162,455 B1

UNIQUE TIME GENERATING DEVICE AND AUTHENTICATING DEVICE USING THE SAME

TECHNICAL FIELD

The present invention relates to an authentication data issuing system based on unique time generation, a recording media for storing authentication data issued by the authentication-data issuing system and an authentication data verifying system, which exercise general control of information issued by particular computers, verify authentication data issued by some of the computers and thereby effectively avoid damages that would be caused by any person stealing the authentication data.

BACKGROUND ART

Today, various prepaid cards, each prestoring money amount information corresponding to a certain amount of money paid in advance, are being widely used in various commercial transactions, such as for using railroad facilities and public telephones and playing with Japanese pinball (hereinafter "pachinko") game machines. These prepaid cards are inserted into card reader/writers attached to or contained in various pieces of equipment, such as automatic ticket checkers, automatic ticket vending machines, public telephones and game machines, where each amount due is subtracted from the remaining balance on the card and the prestored money amount information is rewritten accordingly.

Besides, in various banking agencies and the like, account transfer services using personal computers and public telephone lines have come into wide use, and it is expected that every banking and currency settlement service will be conducted through an electronic currency system in the near future (as disclosed in, for example, Japanese Patent Publication No. HEI-7-11723).

Recently, an increasing number of persons have been attempting to tamper or copy the stored data on the prepaid cards without due authorization, so that prepaid card issuing companies are exercising, against such fraudulent attempts, preventive measures that include encryption and scrambling of the stored data. In the account transfer and various electronic business transactions, many persons have been attempting to acquire other person's authentication data in a fraudulent manner, in order to make unfair benefits by pretending to be the true prepaid card holder.

DISCLOSURE OF THE INVENTION

The present invention has been made in view of such inconveniences encountered by prior techniques and seeks to provide an improved technique which, using a unique time generating device previously proposed by the applicant of the present application (in PCT/JP/02433), can effectively avoid damages that would be caused by any person stealing authentication data.

In order to accomplish the above-mentioned object, the present invention provides an authentication-data issuing system based on unique time, the authentication-data issuing system including a plurality of computers connected with each other via communication lines with one of the computers set to function as a master computer, the master computer comprising: a unique time generating device including time keeping means for sequentially outputting unit time values at predetermined intervals over a preset time-measuring period that begins at a given start point on a selected date and terminates at a given future end point and accumulating means for sequentially accumulating the unit time values output by the time keeping means so as to constantly measure a changing elapsed time within the time-measuring period; transmitter means for, during communication between the master computer and another of the computers subservient to the master computer, transmitting, from the master computer to the subservient computer, authentication data based on an elapsed time measurement, corresponding to a given time point, indicated by the unique time generating device; and register means for receiving and registering an issuance history of unique authentication data created and issued by the subservient computer imparting additional data, unique to the subservient computer, to the authentication data transmitted by the master computer.

According to another aspect of the present invention, there is provided an authentication-data issuing system based on unique time, the authentication-data issuing system including a plurality of computers connected with each other via communication lines with one of the computers set to function as a master computer, the master computer including a unique time generating device including time keeping means for sequentially outputting unit time values at predetermined intervals over a preset time-measuring period that begins at a given start point on a selected date and terminates at a given future end point and accumulating means for sequentially accumulating the unit time values output by the time keeping means so as to constantly measure a changing elapsed time within the time-measuring period. Each of the computers subservient to the master computer comprises: receiver means for, during communication with the master computer, receiving authentication data based on an elapsed time measurement, corresponding to a given time point, indicated by the unique time generating device of the master computer; issuer means for creating and issuing unique authentication data by imparting additional data, unique to the subservient computer, to the authentication data received via the receiver means from the master computer; and transmitter means for transmitting, to the master computer, an issuance history of the unique authentication data created and issued by the issuer means.

According to still another aspect of the present invention, there is provided an authentication-data issuing system based on unique time, the authentication-data issuing system including a plurality of computers connected with each other via communication lines with one of the computers set to function as a master computer, where each of the computers subservient to the master computer comprises: a unique time generating device including time keeping means for sequentially outputting unit time values at predetermined intervals over a preset time-measuring period unique to the computer that begins at a given start point on a selected date and terminates at a given future end point and accumulating means for sequentially accumulating the unit time values output by the time keeping means so as to constantly measure a changing elapsed time within the time-measuring period; issuer means for creating and issuing unique authentication data, peculiar to the subservient computer, on the basis of an elapsed time measurement indicated by the unique time generating device; and transmitter means for transmitting, to the master computer, an issuance history of the unique authentication data created and issued by the issuer means.

According to still another aspect of the present invention, there is provided an authentication-data issuing system based on unique time, the authentication-data issuing system including a plurality of computers connected with each other via communication lines with one of the computers set to function as a master computer. Each of the computers subservient to the master computer comprises a unique time generating device including time keeping means for sequentially outputting unit time values at predetermined intervals over a preset time-measuring period unique to the computer that begins at a given start point on a selected date and terminates at a given future end point and accumulating means for sequentially accumulating the unit time values output by the time keeping means so as to constantly measure a changing elapsed time within the time-measuring period. The master computer, exercising general control of the subservient computers, includes register means for receiving and registering an issuance history of data created and issued by each of the subservient computers on the basis of an elapsed time measurement indicated by the unique time generating device of the subservient computer.

According to still another aspect of the present invention, there is provided a recording media having stored thereon unique authentication data created by any one of the subservient computers, and the recording media is issued by the subservient computer.

According to still another aspect of the present invention, there is provided an authentication-data verifying system including a plurality of computers connected with each other via communication lines with one of the computers set to function as a master computer. Each of the computers subservient to the master computer comprises: reading means for reading unique authentication data issued by any one of the subservient computers on the basis of information received from another of the subservient computers, or reading unique authentication data issued by any one of the subservient computers and recorded on a recording media; transmitter means for transmitting the unique authentication data read by the reading means to the master computer for subsequent collation thereby; and receiver means for receiving from the master computer a result of collation between an issuance history of the unique authentication data by each of the subservient computers registered in the master computer and the unique authentication data transmitted by the transmitter means.

According to still another aspect of the present invention, there is provided an authentication-data verifying system including a plurality of computers connected with each other via communication lines with one of the computers set to function as a master computer, where the master computer comprises: receiver means for receiving unique authentication data transmitted by transmitter means of any one of the computers subservient to the master computer, the unique authentication data being issued by the subservient computer and read by reading means of the subservient computer; and collator means for collating between the unique authentication data received by the receiver means and an issuance history of the unique authentication data by each of the subservient computers that is registered in the master computer; and transmitter means for transmitting a result of collation by the collator means to receiver means of the subservient computer.

DESCRIPTION OF THE DRAWINGS

FIG. 9 is a diagram illustrating contents of authentication data issued from a card distributor's computer to a pachinko house of FIG. 1;

FIG. 13 is a diagram illustrating contents of information presented on a display means when a card is used with updated data;

BEST MODE FOR CARRYING OUT THE INVENTION

In PCT Patent Application No. PCT/JP/02433 filed at an earlier date, the applicant of the present application proposed a unique time generating device and fully explained the concept of "unique time" generated by the device. Unlike the today's commonly-used time concept based on Greenwich Mean Time, the "unique time" is a time concept to linearly count a preset finite time period from the zeroth toward the last second thereof, i.e., to constantly a measure changing elapsed time toward the last second within the preset time-measuring period.

On the basis of such a unique time concept, the present invention provides for authentication of a given computer on a communication network or authentication of a recording media storing thereon authentication data issued by a given computer on the communication network. First, the present invention will be described hereinbelow in relation to a system for issuing and authenticating prepaid cards for use in Japanese pinball, i.e., "pachinko", game machines equipped with card readers (commonly known as CR-type pachinko game machines).

Figure 1:
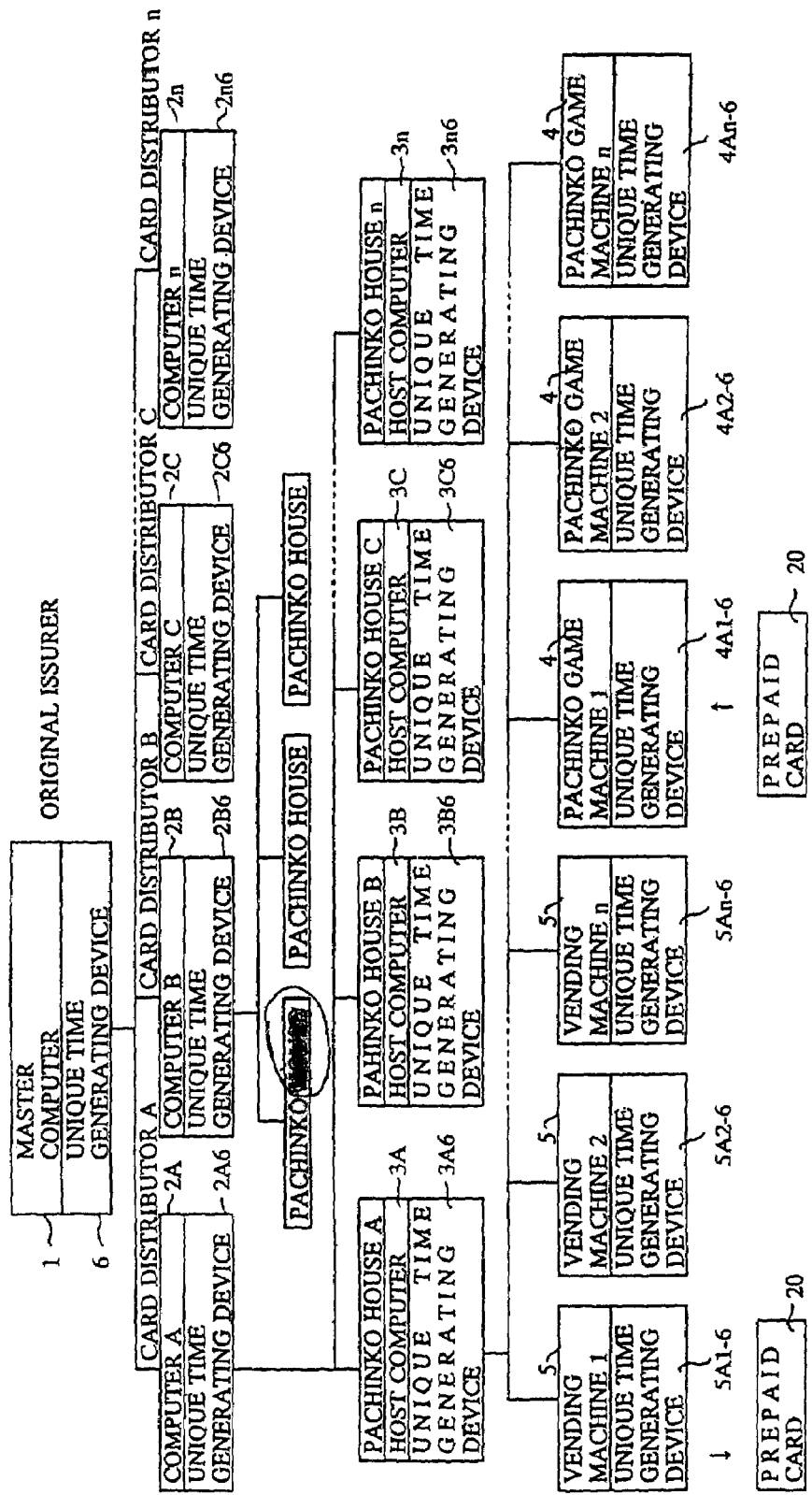
FIG. 1 is a network diagram illustrating an authentication-data issuing system, according to a best mode of carrying out the present invention, for issuing prepaid cards to be used for pachinko game machines.

In FIG. 1, reference numeral 1 represents a highest-level master computer of an original card issuer company that issues prepaid cards (prepaid pachinko cards), to which are connected, via network lines, subservient second-level computers 2A, 2B, 2C, . . . , 2n of card distributor companies. Further, to the second-level computers 2A, 2B, 2C, . . . , 2n of the card distributor companies are connected host computers (such as those denoted at 3A, 3B, . . . , 3n) of affiliated pachinko houses. In each of the pachinko houses, the host computer (such as 3A) collectively manages or exercising general control of individual pachinko (CR-type) pachinko game machines 4 and prepaid card vending machines 5 located within the house. In addition, in each of the pachinko houses, third-level computers are provided within or connected with the host computer (such as 3A).

Figures 2, 3:
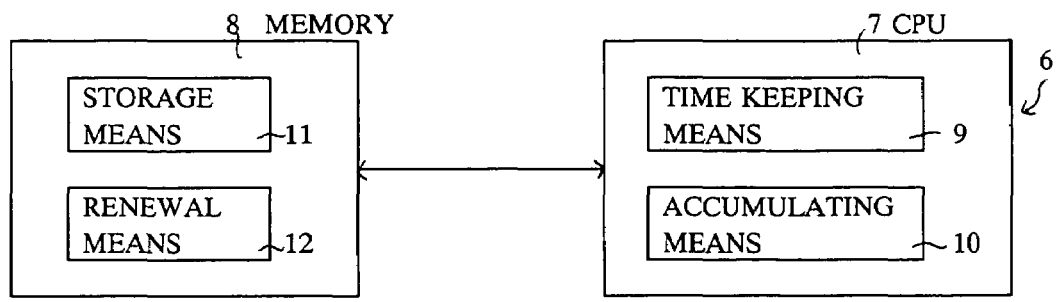
FIG. 2 is a block diagram illustrating a general setup of a unique time generating device employed in the authentication-data issuing system of FIG. 1.
FIG. 3 is a diagram explanatory of a manner in which an elapsed time is measured in accordance with the best mode of the present invention.

The above-mentioned highest-level master computer 1 implements a unique time generating device 6 as shown in FIG. 2 by arranging its CPU 7 to provide a time keeping means 9 and accumulating means 10 and also setting a memory 8 to include a storage means 11 for storing a preset time-measuring period and a renewal means 12 for renewing the time-measuring period. Total time value to be counted over the preset time-measuring period may be optionally set, for example, to correspond to a total value of seconds over a period of ten or 100 years, and every elapsed time within the preset time-measuring period is measured by the time keeping means 9 constantly counting the total time value. For example, the total time values for one, ten and 100 years will be as follows:

Total time value to be counted over a one year period=31,556,925.9747 seconds (one year=365.2425 days);

Total time value to be counted over a ten year period=315,659,250.9747 seconds; and Total time value to be counted over a 100 year period=3,155,692,500.9747 seconds Here, the "total time value to be counted" is expressed in time units of 1/10,000 second measured by an atomic clock (cesium clock), and a "unique time" is given by constantly counting the total time value to identify a changing elapsed time within the preset time-measuring period. Elapsed time (unique time measurement) is typically calculated from both an accumulated time and a subtracted time, as shown in FIG. 3. Specifically, the accumulated time is a time value measured forward or incrementally from the zeroth second toward the total time value to be counted, while the subtracted time is a time value measured rearward or decrementally from the total time value toward the zeroth second. Alternatively, a unique time measurement may be calculated from either the accumulated time or the subtracted time or by adding some variables to the time value.

The accumulating means 10 sequentially accumulates successive unit time values measured the time keeping means 9; that is, the accumulating means 10 calculates an accumulated time $T_n$ from the zeroth second toward the last second of the total time value $T_t$ to be counted as well as a subtracted time from the last second toward the zeroth second $(T_t - T_n)$, so as to constantly provide a changing elapsed time within the preset time-measuring period (see FIG. 3). Once the time value accumulated by the accumulating means 10 has reached the predetermined total time value to be counted $T_t$ (i.e., once the counting of all the seconds in the 100 year period has been completed), the time period renewal means 12 in the memory 8 is activated to renew the time-measuring period for another 100 years and instructs the time keeping means 9 to count the renewed time-measuring period. In this way, the unique time generating device provided in the computer is updated once for every 100 years.

Figure 4:
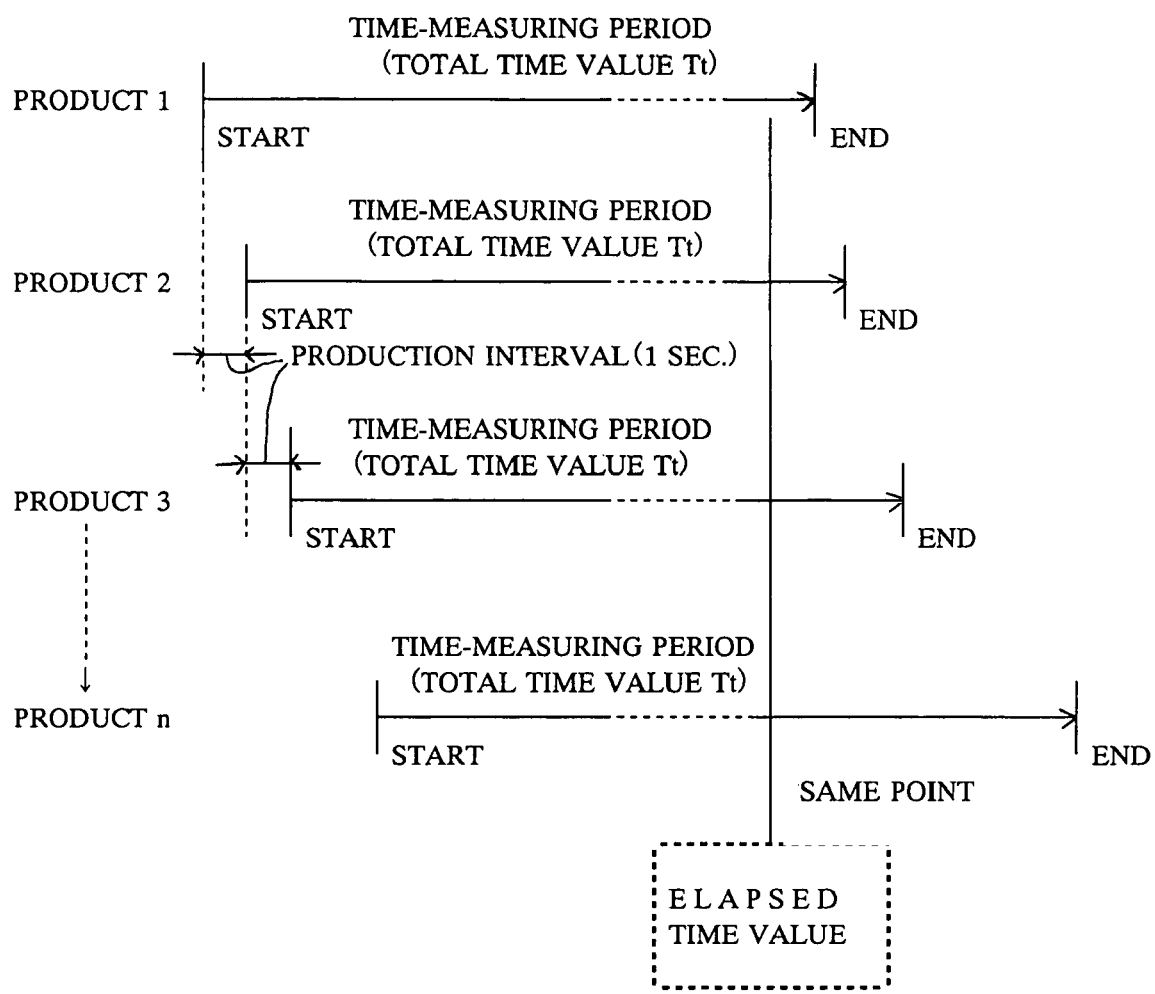
FIG. 4 is a diagram showing examples of different time-measuring periods assigned to a plurality of unique time generating devices provided in a plurality of computers.
Figure 5:
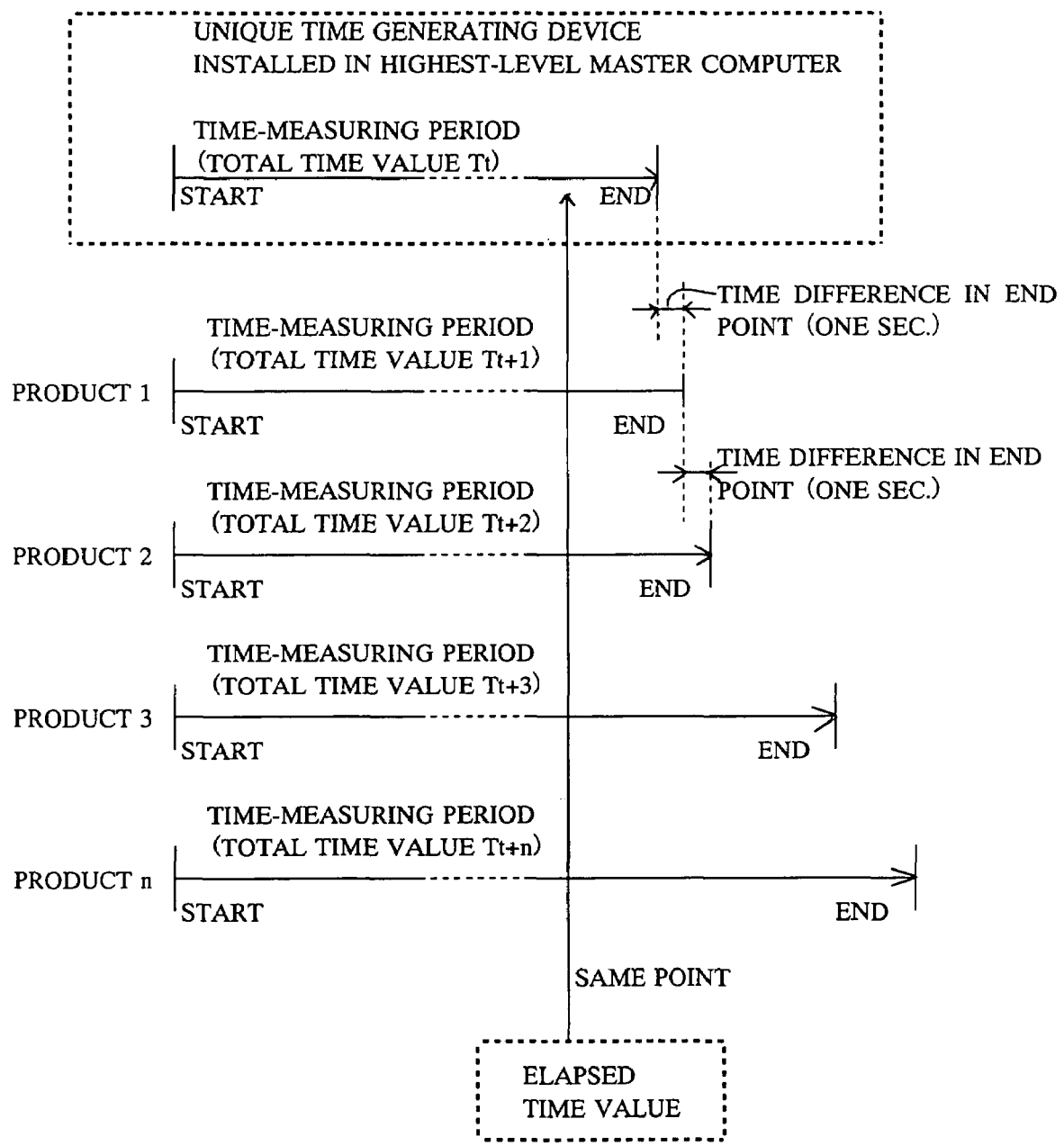
FIG. 5 is a diagram showing other examples of different time-measuring periods assigned to other unique time generating devices.

Similar unique time generating device is provided in each of the second-level computers 2A, 2B, . . . , 2n of card distributor companies A to n directly connected to or subservient to the highest-level master computer 1, the third-level computers 3A, 3B, . . . , 3n of the pachinko houses connected to the second-level computers 2A, 2B, . . . , 2n and the fourth-level computers of the individual pachinko game machines 4 and prepaid card vending machines 5 connected to the third-level computers 3A, 3B, . . . , 3n. All these unique time generating devices provided in the above-mentioned computers are set to indicate unique elapsed time measurements, different from each other, at every given point. For example, as seen from "product 1" to "product n" in FIG. 4, the unique time generating devices are sequentially produced, at intervals of, for example, one second, and they are set to start measuring time at different points that depend on the production intervals and thus differ in measured elapsed time from each other by one second; for the same reason, they are set to end measuring time at different points that are displaced from each other by one second due to the differences of their time-measurement start points, although the total time value to be counted $T_t$, i.e., the length of the time-measuring period (e.g., 3,155,692,500.97 seconds), is the same for all the products, i.e., unique time generating devices. Alternatively, the length of the time-measuring period may be made different among these products or unique time generating devices. As shown in FIG. 5, the unique time generating device 6 provided in the master computer 1 may be set as a master device and the total time values $T_t$ of product 1 to product n sequentially produced or supplied on the basis of unique time generation by the master device may be set to progressively become great relative to that of the master device in such a way that each of the products has a total time value $T_t$ greater by one second than that of the preceding product. It may be assumed that all these unique time generating devices including the master device are caused to start measuring time like a stopwatch. This way, all the unique time generating devices including the master device are allowed to start measuring at a same start point up to their unique total time values (i.e., up to the end of different time-measuring periods); thus, they stop the counting at different end points that will sequentially arrive every second. As a result, all the unique time generating devices indicate different elapsed time measurement at every given time point within the different time-measuring periods, as shown in FIG. 5.

Figure 6:
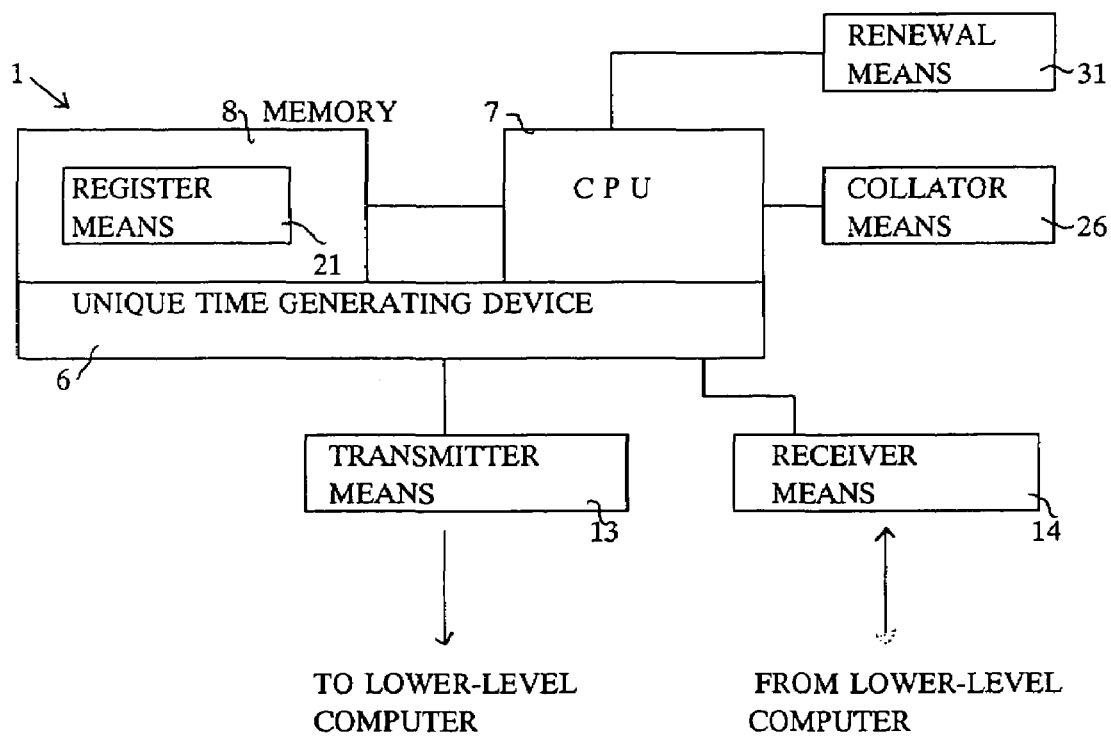
FIG. 6 is a block diagram illustrating a general organization of a master computer shown in FIG. 1.
Figure 7:
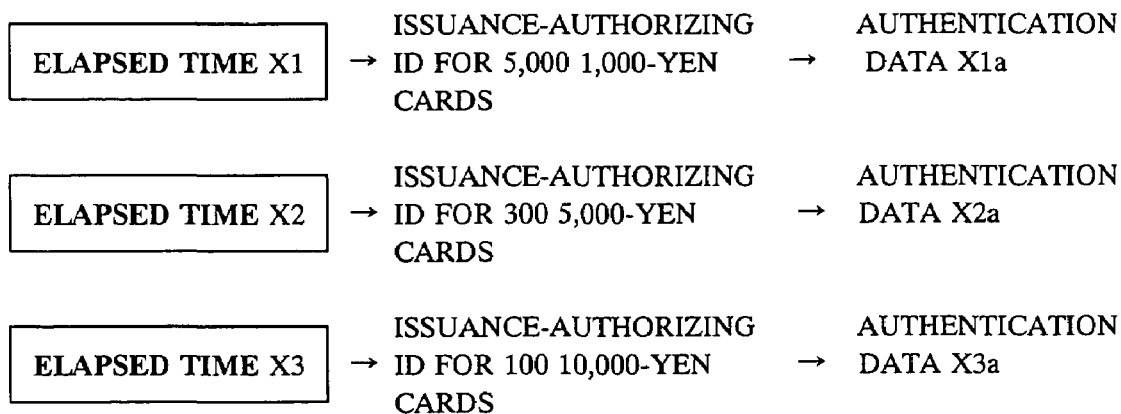
FIG. 7 is a diagram illustrating contents of authentication data transmitted from the master computer of FIG. 1.

As clearly shown in FIG. 6, the highest-level master computer 1 includes a transmitter means 13 that transmits, to the respective computers 2A, 2B, . . . , 2n of the card distributor companies, authentication data based on an elapsed time measurement at a given time point indicated by the unique time generating device 6 thereof. Let's assume here that the master computer 1 generates original authentication data X1$a$, X2$a$ and X3$a$ (FIG. 7) corresponding to elapsed times measured by the unique time generating device 6 and sequentially issues these original authentication data X1$a$, X2$a$ and X3$a$ to one of the second-level computers (e.g., computer 2A). Specifically, each of the thus-issued original authentication data X1$a$, X2$a$ and X3$a$ is transmitted to the second-level computer (e.g., computer 2A), where it is used as identification (ID) data to authorize issuance of a prepaid card, i.e., issuance-authorizing identification data (see FIG. 7).

Figure 8:
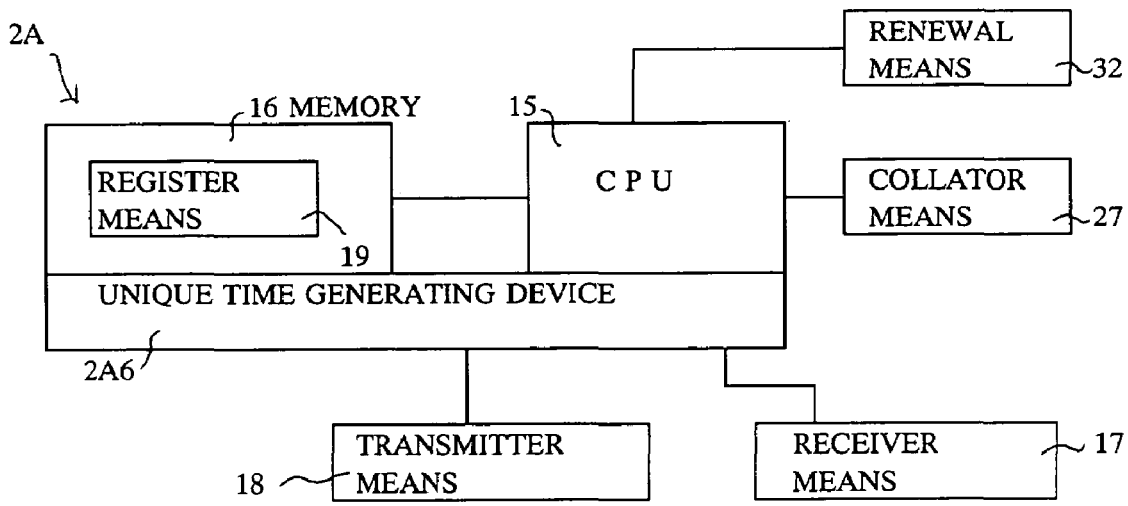
FIG. 8 is a block diagram illustrating a general organization of a card distributor's computer of FIG. 1.

More specifically, each of the original authentication data X1$a$, X2$a$ and X3$a$ transmitted by the transmitter means 13 of the master computer 1 is received by the second-level computer of one of the card distributors requesting the issuance (e.g., card distributor A). As shown in FIG. 8, this second-level computer 2A of card distributor A also includes a CPU 15, a memory 16 having provided therein the unique time generating device 2A6, a receiver means 17 and a transmitter means 18. Each of the original authentication data X1$a$, X2$a$ and X3$a$ received by the receiver means 17 of the second-level computer is temporarily stored into a register means 19 within the memory 16 and then read out from the register means 19 upon request from the host computer of any one of the pachinko houses. If the receiver means 17 of the second-level computer 2A receives a request for issuance of authentication data for 1,000 1,000-YEN-worth prepaid cards, 100 5,000-YEN-worth prepaid cards and 20 10,000-YEN-worth prepaid cards, then the computer 2A reads out the authentication data X1$a$, X2$a$ and X3$a$ from the register means 19 and imparts thereto unique additional authentication data A1–A1000, B1–B100 and C1–C20, respectively, that are based on elapsed time measurements sequentially output by the unique time generating device 2A6 of the computer 2A. In this way, unique authentication data corresponding to the respective numbers of the 1,000-YEN, 5,000-YEN and 10,000-YEN prepaid cards are created on the basis of elapsed time measurements sequentially output by the unique time generating device 2A6; that is, the authentication data of the 1,000-YEN prepaid cards will be X1$a$+A1 to X1$a$+A1000, the authentication data of the 5,000-YEN prepaid cards will be X2$a$+B1 to X2$a$+B100, and the authentication data of the 10,000-YEN prepaid cards will be X3$a$+C1 to X3$a$+C20. The thus-created authentication data are then transmitted from the transmitter means 18 of the second-level computer 2A to the host computer 3A of the pachinko house A. At the same time, the computer 2A of card distributor A erases the identification, actually issued to the pachinko house's host computer (e.g., host computer 3A), from among the issuance-authorizing identifications corresponding to the authentication data X1$a$, X2$a$ and X3$a$. Once the identification authorizing issuance of a prepaid card (issuance-authorizing identification) has run out as a result of the erasure, new original authentication data are supplied by the master computer 1.

Figure 10:
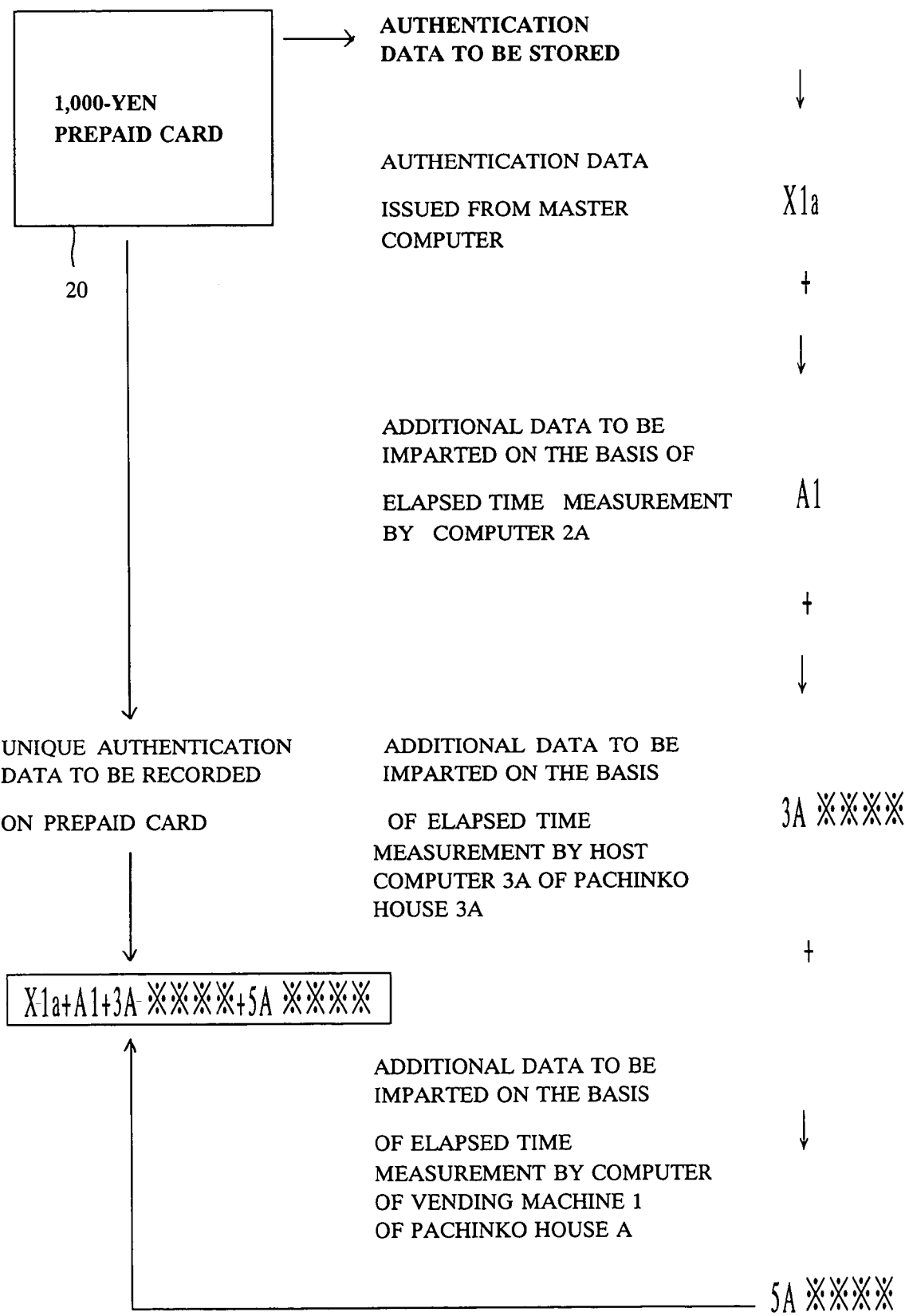
FIG. 10 is a diagram illustrating a processing flow for creating unique authentication data.

In each of the pachinko houses (the following description will be made primarily about the pachinko house A), the receiver means of the host computer 3A receives the authentication data (e.g., X1$a$+A1, X2$a$+B1 and X3$a$+C1) transmitted by the card distributor A. The host computer of each of the pachinko houses is constructed in a similar manner to the second-level computer of FIG. 8 and imparts, to the received authentication data (e.g., X1$a$+A1, X2$a$+B1 and X3$a$+C1), identification based on elapsed time measurements sequentially indicated by the unique time generating device 3A6 of the host computer. Further, in each of the vending machines 5 capable of dispensing 1,000-YEN, 5,000-YEN and 10,000-YEN prepaid cards to customers, the unique time generating device (e.g., 5A1-6) provided in its computer imparts additional identification data based on elapsed time measurements sequentially indicated thereby. Thus, the vending machine 5 in pachinko house A can sell, to customers, prepaid magnetic cards 20 which have stored thereon unique authentication data (X1$a$+A1+3A**+ 5A**) as a result of sequential impartment of various unique data based on the respective elapsed time measurements indicated by the unique time generating devices at various hierarchical levels, as shown in FIG. 10.

The ultimate unique authentication data thus recorded on each of the prepaid cards 20 (X1$a$+A1+3A**+5 A**) is transmitted from the lowest-level computer of the vending machine 5 to the receiver means of the host computer 3A of the pachinko house A, which in turn identifies, from the recorded ultimate unique authentication data, an up-to-date record or history of prepaid card issuance by the vending machine 5 and transmits the ultimate unique authentication data to the receiver means 17 of the second-level computer 2A of card distributor A shown in FIG. 8. The second-level computer 2A of card distributor A receives, by means of its receiver means 17, the ultimate unique authentication data transmitted from all the associated pachinko houses and stores them into the register means 19 thereof, via which the computer 2A transmits the ultimate authentication data to the receiver means 14 of the highest-level main computer 1. Then, the master computer 1 receives the ultimate unique authentication data transmitted from the computers 2A to 2$n$ of the individual card distributor companies and stores them in the register means 21 within the memory 8.

Note that each of the master computer 1 and subservient computers 2A and 3A of card distributor A and pachinko house stores the received ultimate unique authentication data after collating it with the corresponding authentication data (issuance-authorizing identification) previously sent to the subservient computers. Also, the master computer 1 has prestored therein various attributes of the unique time generating devices provided therein and in all the subservient computers as shown in FIG. 5, so that the master computer 1 rejects the registration, in its register means, of any ultimate unique authentication data containing an attribute that does not agree with the prestored attributes.

In the above-mentioned manner, each of the prepaid cards 20 sold by vending machine 1 of pachinko house A can be used as a common card universally usable in all the pachinko houses under the control of card distributor company A or of the master computer 1; for example, the issued prepaid card 20 can be used for "pachinko game machine 4" in pachinko house A.

Figure 11:
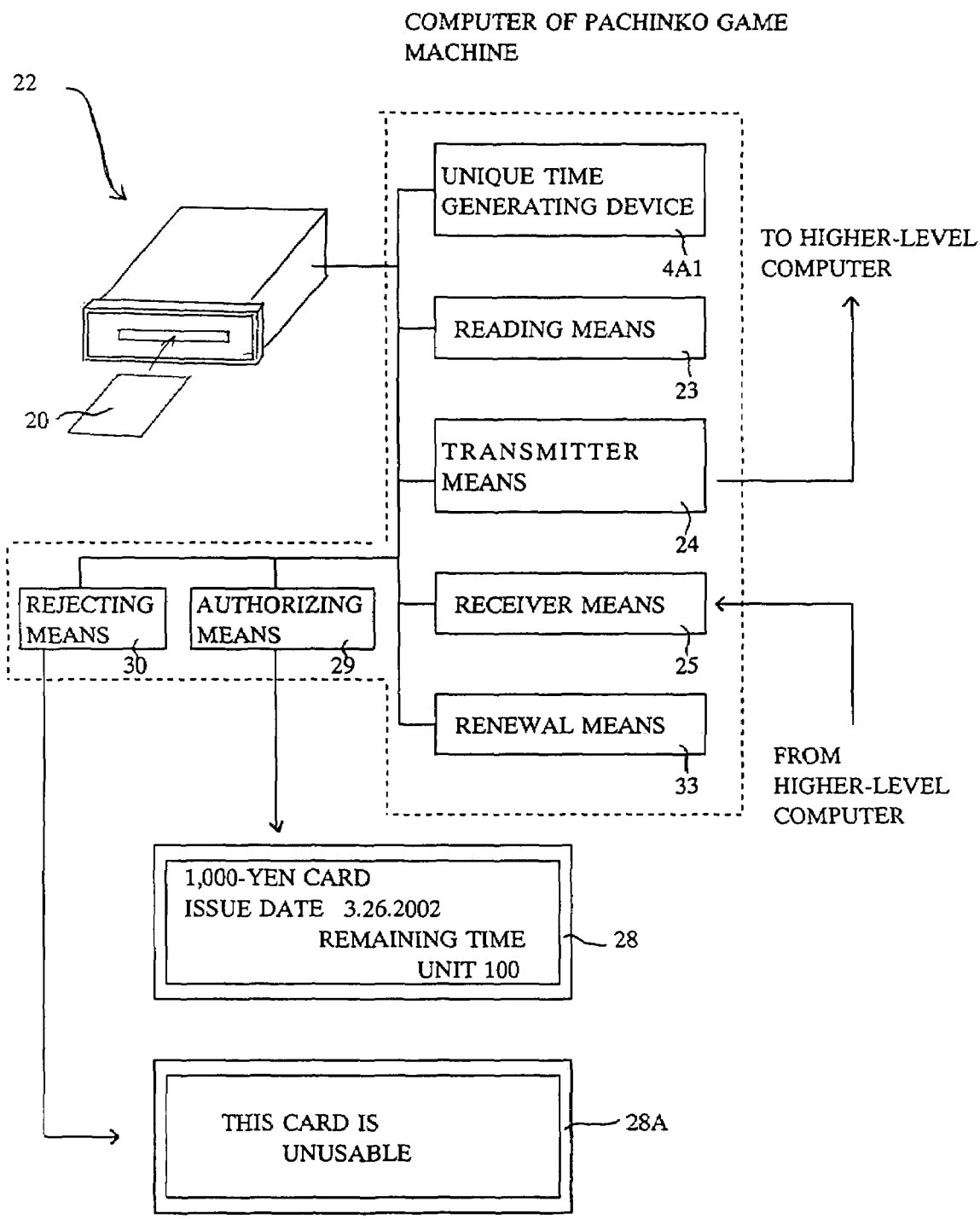
FIG. 11 is a block diagram illustrating a general organization of a pachinko game machine shown in FIG. 1.

The pachinko game machine of each of pachinko houses A to n ((the following description will be made primarily about pachinko game machine 4) includes a card reader/writer 22 contained in or connected to the lowest-level computer of pachinko game machine 4 as shown in FIG. 11. Reading means 23 of the computer in FIG. 11 reads the ultimate unique authentication data recorded on the prepaid card 22 that is inserted in the card reader/writer 2. The ultimate unique authentication data (X1$a$+A1+3A**+ 5A) read out from the prepaid card 22 by the reading means 23 is transmitted from the transmitter means 24 of the computer to the host computer 3A of pachinko house A. The ultimate unique authentication data received by the receiver means of the host computer 3A is then forwarded, through the receiver means 17 of the computer 2A of card distributor A, to the receiver means 14 of the master computer 1 for necessary collation. The computer 2A of card distributor A or the master computer 1 includes a collator means 26 or 27 as shown in FIG. 6 or 8, which determines whether the ultimate unique authentication data (X1$a$+A1+3A+5A) received by the receiver means 14 or 17 has been duly registered in the up-to-date record or history of issuance in the register means 19 or 21. When, for example, the collator means 27 in the computer 2A of card distributor A determines that the unique authentication data received from the subservient computer (host computer 3A of pachinko house A) does not match the data stored in the register means 19, the unique authentication data is transmitted from the transmitter means 18 of the computer 2A to the receiver means 14 of the master computer 1, where the data is collated by the collator means 26. Thus, as long as the collator means 26 or 27 of the master computer 1 or the computer 2A of card distributor A determines that the unique authentication data (X1a+A1+3A+5A**) received from the subservient computer (host computer 3A of pachinko house A) matches the data stored in the register means 19 or 21, the means 26 or 27 passes the determination or collation result, through the host computer 3A, to the computer of the pachinko game machine. Finally, the collation result is received by the receiver means 25 shown in FIG. 11. The collation result, of the inserted prepaid card, by the collator means 26 or 27 thus received by the receiver means 25 is visually shown on a display 28 of pachinko game machine 4 shown in FIG. 11. If, for example, the prepaid card 20 inserted in the card reader/writer 22 is collated with the registered data and determined, by the collator means 26 or 27 of the higher-level computer, as being a genuine or authentic card rightly issued by any one of the computers under the control of the master computer 1, an authorizing means 29 accepts the prepaid card 20 as authentic and displays various information, such as the type, issue date and remaining units, of the card (see FIG. 11) on the display that is typically in the form of an LCD (Liquid Crystal Display) or CRT (Cathode Ray Tube). If, on the other hand, the prepaid card 20 inserted in the card reader/writer 22 is collated with the registered data, determined, by the collator means 26 or 27 of the higher-level computer, as not matching the data stored in the register means 19 or 21 and such a collation result is received by the receiver means 25, a rejecting means 30 determines the inserted prepaid card 20 as not being an authentic card rightly issued by any one of the computers under the control of the master computer 1 and displays a rejection message "This card is unusable." on a display 28A in the form of an LCD or CRT; in this case, the rejecting means 30 also instructs the card reader/writer 22 to reject the card as false.

The prepaid card 20 determined as authentic or acceptable by the authorizing means 29 can be used in pachinko game machine 4 by the holder or user of the card. Specifically, if the user, holding a 1,000-YEN prepaid card 20, selectively depresses one of a plurality of buttons on pachinko game machine 4 to purchase pachinko balls for 500 YEN (50 units) while referring to the information of the card 20 shown on the display 28, the selected purchase information is transmitted from the pachinko game machine's computer, through the host computer 3A of pachinko house A and computer 2A of card distributor A, to the master computer 1 in association with the ultimate unique authentication data stored on the card 20.

Figure 12:
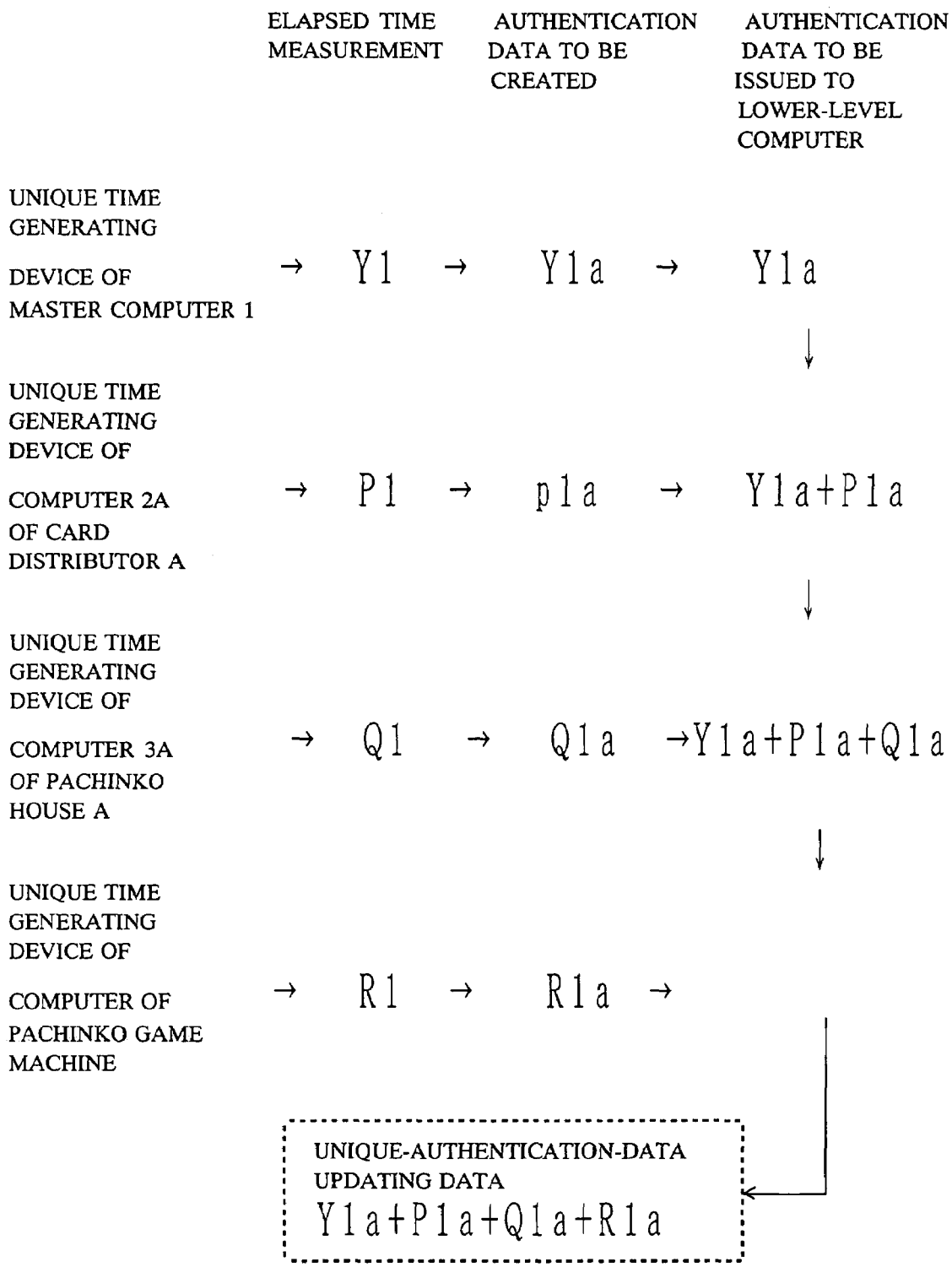
FIG. 12 is a diagram illustrating a processing flow for creating unique-authentication-data updating.

In the master computer 1 having received the selected purchase information, a renewal means 31 first confirms that the unique authentication data (X1a+A1+3A +5A**) received in association with the selected purchase information matches the data previously stored in the register 21 and then creates identification (ID) to authorize the selected purchase. As shown in FIG. 12, the purchase-authorizing ID is created, as authentication-data-updating data Y1a, on the basis of an elapsed time measurement Y1 indicated by the unique time generating device 6 provided in the master computer 1, and the thus-created authentication-data-updating data Y1a is then transmitted from the receiver means 13 to the second-level computer 2A along with the unique authentication data (X1a+A1+3A+5A**).

Similarly, in the second-level computer 2A of card distributor A, a renewal means 32 first confirms that the unique authentication data matches the data stored in the register 19 and then creates identification data to authorize the selected purchase. As shown in FIG. 12, the purchase-authorizing ID is created, as authentication-data-updating data P1a, on the basis of an elapsed time measurement P1 indicated by the unique time generating device 2A6 provided in the computer 2A, and the thus-created authentication-data-updating data P1a is then transmitted from the receiver means 18 to the host computer 3A subservient to the computer 2A along with the authentication data Y1a created by the master computer 1.

In the host computer 3A as well, further authentication-data-updating data Q1a is created on the basis of a current elapsed time measurement Q indicated by the unique time generating device 3A6 and added to the received data (Y1a+P1), and the added result is transmitted to the pachinko game machine 4. Finally, in the pachinko game machine 4, further authentication-data-updating data R1a is created on the basis of a current elapsed time measurement R1 indicated by the unique time generating device 4A1-6 provided in its computer and added with the data Y1a, P1a and Q1a to provide ultimate authentication-data-updating data (Y1a+P1a+Q1a+R1a), as shown in FIG. 12.

In the computer of the pachinko game machine 4, a renewal means 33 updates the last-stored unique authentication data (X1a+A1+3A**+5A**) on the prepaid card 20, on the basis of the updating data (Y1a+P1a+Q1a+R1a); the updating may be done by erasing the last unique authentication data or adding thereto the updating data. What is essential here is that the last-stored unique authentication data should be altered on the basis of the updating data (Y1a+P1a+Q1a+R1a). The alteration of the unique authentication data is effected via the card reader/writer 22, and thus the prepaid card 22 is discharged from the reader/writer 22 with its unique authentication data altered on the basis of the updating data corresponding to the selected purchase of pachinko balls for 500 YEN (50 units).

The altered data (updated unique authentication data) is transmitted to the higher-order computers, one after another, in the hierarchical network structure. Thus, in the computer 2A of card distributor A, the renewal means 32 replaces the last unique authentication data, registered in the register means 19, with the updated unique authentication data. Then, in the master computer 1 as well, the renewal means 31 replaces the last unique authentication data, registered in the register means 21, with the updated unique authentication data. In this way, the up-to-date record or history of issuance of the unique authentication data by each of the higher-order computers is updated.

Next time the prepaid card 20 is used at any one of the pachinko game machines under the control of the master computer 1, the updated unique authentication data is read out from the card 20 and collated with the data stored in the registers 19 and 20 of the upper-order computers to ascertain its acceptability, in a similar manner to the above-mentioned. At this time, data indicative of the most recent use of the card 20 is displayed on the display 28 of the pachinko game machine 28, as shown in FIG. 13.

As described above, according to the prepaid card issuing and authenticating system, each of the pachinko houses under the control of the master computer 1 imparts, to every inserted prepaid card 20, additional authentication data that is based on respective elapsed time measurements indicated by the individual unique time generating devices, so that various data relating to the issuance and use of the card can be recorded on the card substantially in a time-series fashion. Therefore, every issued prepaid card will have an utterly unique identification and its recorded data will be updated upon insertion into the reader/writer 22. Thus, in a situation where 1,000 or 10,000 false prepaid cards are fabricated which have same data as recorded on a fairly issued authentic card and when someone actually inserts one of the cards into a pachinko game machine, the recorded data on the inserted card is updated in the above-described manner, so that all of the other cards than the initially inserted one will be automatically rejected as unusable or unacceptable (the original authentic card will also be rendered unusable). With such an arrangement, unfair alteration or tampering or forgery of prepaid cards will end in meaningless effort and thus a thorough self-defense (i.e., safeguard against unfair transfer of the cards to other persons and theft of the cards) is achieved by the present invention.

Whereas the authentication-data-updating data are passed downward to the fourth-level computer in the above-described best mode as shown in FIG. 12, such updating data may be passed from the fourth-level computer upward to the higher-order computers so that same authentication-data-updating data is ultimately shared between the master computer 1 and the fourth-level computer and a prepaid card is issued with the updated unique authentication data. Further, whereas the above-described best mode is arranged such that the data to rewrite data to be recorded on a prepaid card 20 is transmitted to the higher-order computers after the necessary collation is performed on the card 20 inserted in the card reader/writer 22 and then the card 20 is judged to be a fairly issued card, it is preferable that such information exchanges be conducted collectively at one time.

Moreover, whereas in the above-described best mode the unique time generating device is provided in each of the computers of the card distributors, pachinko houses and vending machines and pachinko game machines of the pachinko houses, all of these computers need not necessarily contain such a unique time generating device. Namely, in one alternative, the subservient computers under the control of the master computer 1 may impart, to authentication data based on an elapsed time measurement and received from the master computer 1, respective unique additional data (differing among the computers) so that unique authentication data created by combining these unique data is recorded on a prepaid card 20 to be newly issued or updated (as recited in claims 2 and 8 appended hereto). In this case, it is preferable that the master computer 1 at the highest level in the hierarchical structure should prestore the respective unique additional data of the individual subservient computers so as to be able to ascertain via which of the channels has been issued the unique authentication data ultimately recorded on the card 20 and registered or updated in the register means 21 (as recited in claim 8 appended hereto).

Furthermore, the subservient computers under the control of the master computer 1 have been described above as providing the unique time generating devices that indicate different elapsed time measurements at every given time point. Each of these unique time generating devices may be implemented by a software program installed in the corresponding computer, or may be provided on an IC chip built in the computer, or may be a discrete driver or generator external to the computer. Further, the unique time generating device may be provided in each of the subservient computers under the control of the master computer 1 with the master computer 1 or owner of the computer 1 operating as an initial or original card supplier (as recited in appended claims 6 and 7). Namely, if the initial card supplier is arranged to prestore contents of data to be generated by the individual unique time generating devices which include their respective elapsed time measurements as well as their respective attributes relative to the master computer 1, it is possible to ascertain via which procedure has been issued the unique authentication data ultimately recorded on the card 20 and registered or updated in the register means 21 (as recited in appended claim 8). In addition, the computer of each of the card distributors may be set to operate as a secondary supplier which supplies the lower-order computers with unique time measurements received from the master computer 1.

In the above-described best mode, each of the vending machines 5 and pachinko game machines 4 has a computer or unique time generating device. Alternatively, without employing such a system, the host computer of each of the pachinko houses may be set to operate as a lowest-level computer which collectively controls the individual vending machines 5 and pachinko game machines 4. In this case, the host computer creates and update the unique authentication data and then records the authentication data on a prepaid card that is issued by the vending machine 5 and used in the pachinko game machine 4.

The highest-level computer in the hierarchical structure has been described above as the "master computer" 1 controlling a plurality of other computers. In this sense, any one of the computers of the card distributors and host computers of the pachinko houses may be set to function as the master computer.

Furthermore, the best mode has been described above in relation to prepaid cards for use in pachinko game machines, the present invention may be applied to other prepaid card instruments, such as those for railroads, ships, airplanes, telephones, amusement parks (as recited in appended claim 9). In this case, the system according to the above-described best mode may be provided in the host computers of the card distributors or in the computers of the vending machines or in computers of automatic ticket checkers, telephones or various equipment installed in the amusement parks (as recited in appended claims 38 and 39).

As obvious from the foregoing description, the present invention achieves the superior benefit that it can effectively avoid damages which would be caused by any person stealing or tampering authentication data recorded on recording media.

EXAMPLES OF PRACTICAL APPLICATIONS

Example 1

Figure 14:
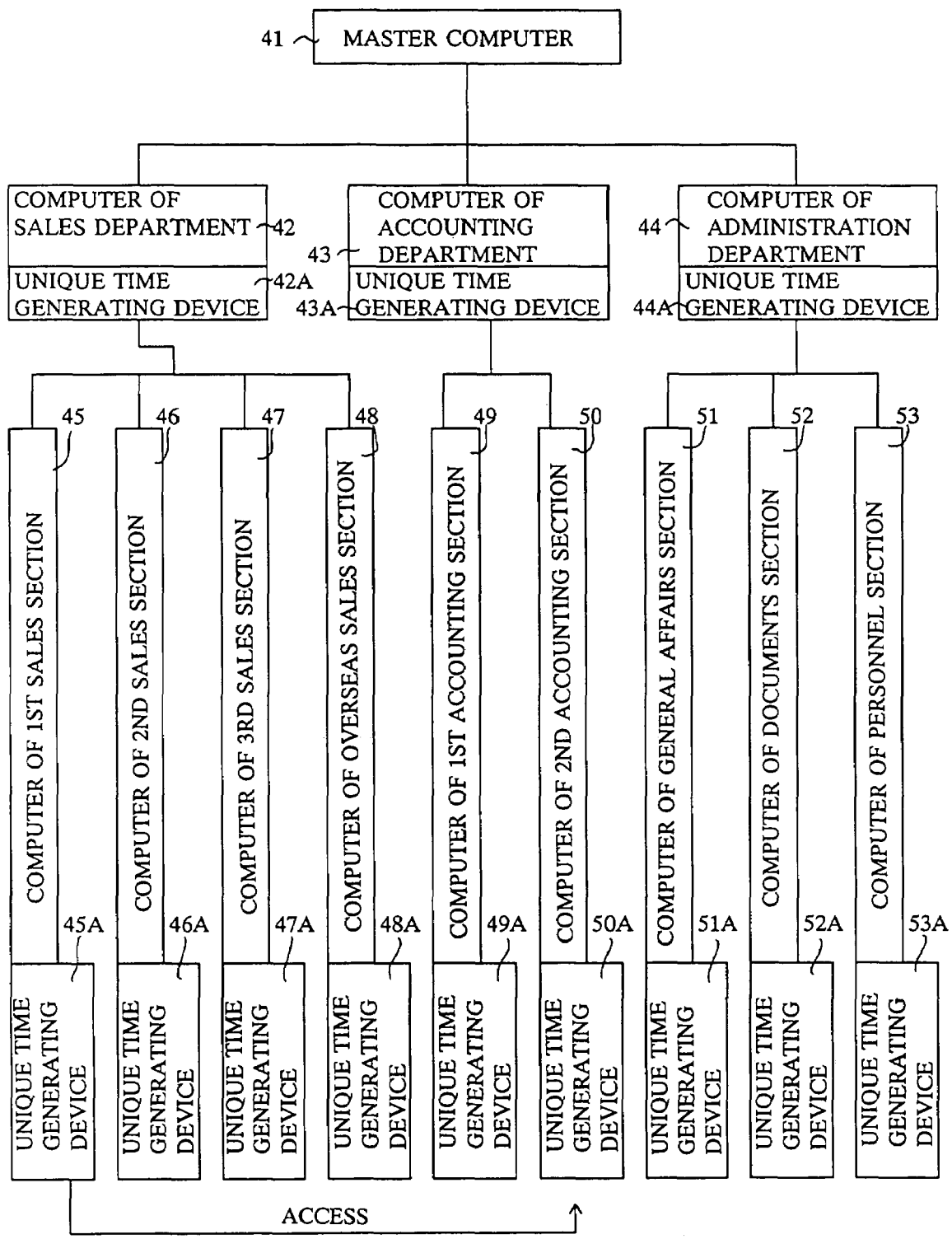
FIG. 14 is a diagram illustrating a hierarchical network of an authentication-data issuing system according to Example 1 installed within a company.

Now, the present invention will be described in relation to a case where it is used for mutual authentication between computers on a hierarchical communication network. FIG. 14 is a diagram illustrating a hierarchical network of computers installed within a company. In this example, a host or master computer 41 of the company does not itself contain a unique time generating device; instead, such a unique time generating device is provided in each of the lower-level computers subservient to the master computer 41 (as recited in appended claims 4, 5, 6 and 7). Directly connected to the master computer 41 are the computers 42, 43 and 44 of a sales department, accounting department and administration department. Further, the computers 45, 46, 47 and 48 of individual sales sections are connected to the sales department's computer 42, the computers 49 and 50 of individual accounting sections to the accounting department's computer 43, and the computers 51 and 52 of individual administration sections to the administration department's computer 44. The computers subservient to or under the control of the master computer 41 are interconnected via the network for intercommunication. Each of the computers other than the master computer 41 is provided with a unique time generating device 42A–52A. As in the above-described best mode, all of these unique time generating devices 42A to 52A are set to measure unique or different elapsed times at every given time point. Memory 54 of the master computer 41 includes a data memory 55 in which are prestored various data on the unique time generating devices 42A to 52A provided in the individual lower-level computers under the control of the master computer 41. The master computer 41 also includes a CPU 56, a renewal means 57, a collator means 58, a transmitter means 59 and a receiver means 60. The memory 54 of the master computer 41 further includes a register means 61.

Figure 16:
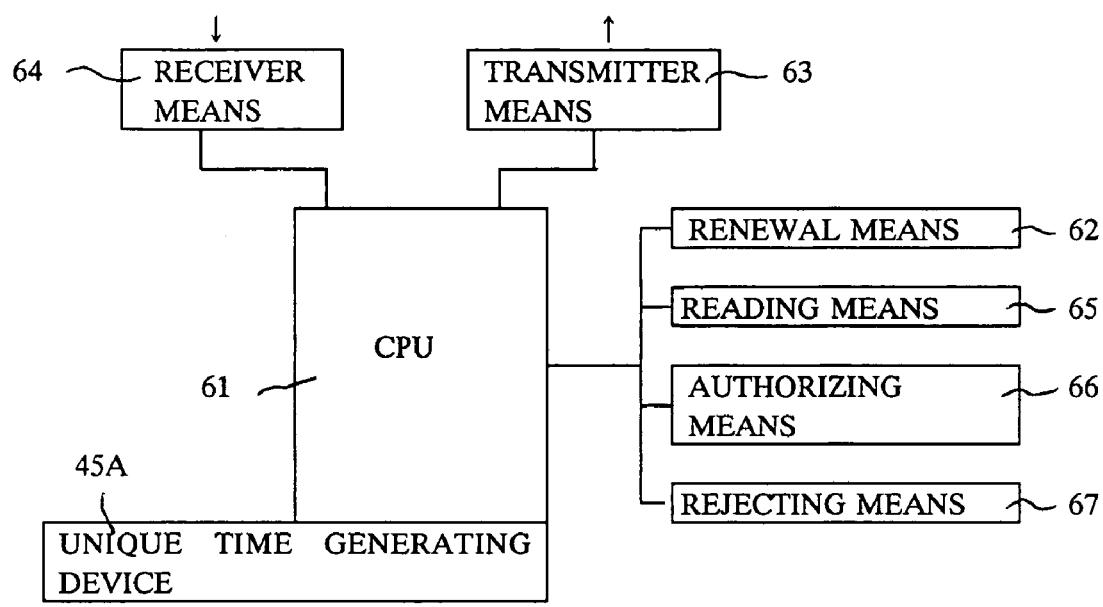
FIG. 16 is a block diagram illustrating a general organization of a lower-level computer subservient to the master computer shown in FIG. 14.

Each of the lower-level or subservient computers 42 to 53 includes a CPU 61, a renewal means 62, a transmitter means 63, a receiver means 64, a reading means 65, an authorizing means 66 and a rejecting means 67, as shown in FIG. 16.

Figure 15:
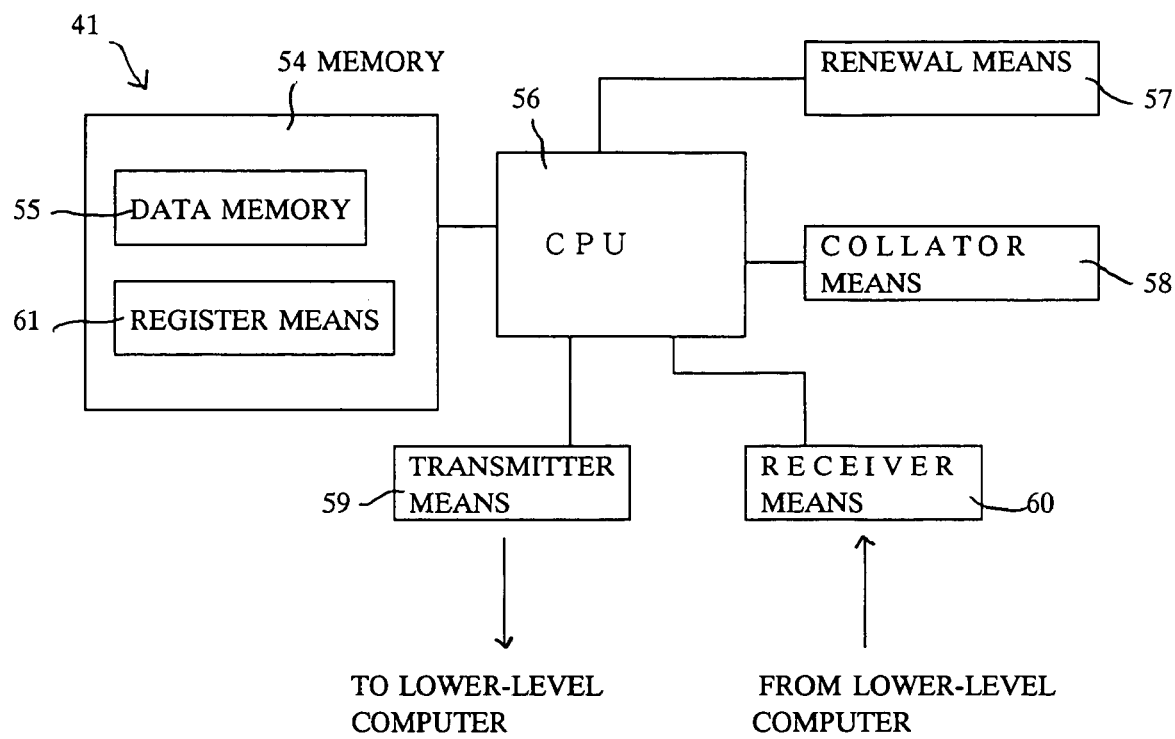
FIG. 15 is a block diagram illustrating a general organization of a master computer shown in FIG. 14.

For example, when the computer 45 of the first sales section desires to access the computer 50 of the second accounting section to request supply of some accounting-related information, the CPU 61 of the computer 45 creates unique authentication data TKA, peculiar to the computer 45, based on an elapsed time measurement TK indicated by the unique time generating device 45A and transmits the thus-created unique authentication data to the higher-level sales department's computer 42 via the transmitter means 63 (see FIG. 16). In turn, the sales department's computer 42 forwards the unique authentication data to the receiver means 42 of the master computer 41. Thus, in the master computer 41, the collator means 58 connected to the CPU 56 collates the unique authentication data TKA, received by the master computer 41, with the information on the individual unique time generating devices prestored in the data memory 55, to find which of the subservient computers has created and issued the authentication data TKA. Once the unique authentication data TKA is determined as having been fairly created and issued by any one of the subservient computers as a result of the collation, the master computer 41 registers the authentication data TKA in the register means 61 as part of an up-to-date record or history of unique authentication data issuance by the subservient computer (see FIG. 15). Once the unique authentication data TKA is duly registered in the register means 61, the transmitter means 59 of the master computer 41 transmits information, authorizing the desired access, to the receiver means 64 of the computer 45 of the first sales section by way of the sales department's computer 42.

Thus, in response to the acceptance or authorization of the desired access, the computer 45 of the first sales section sends, via the transmitter means 63, data to initiate the access to the computer 50 of the second accounting section. At that time, the unique authentication data TKA is sent, as a unique identification of the computer 45, to the receiver means 64 of the computer 50 of the second accounting section along with a request for the accounting-related information.

Then, in the computer 50 of the second accounting section, the reading section 65 reads the unique authentication data TKA from among the received information, and the thus-read authentication data TKA is transmitted from the transmitter means 63, via the accounting department's computer 43, to the receiver means 60 of the master computer 41, where the data TKA is subjected to the collation (see FIG. 16).

In the master computer 41, the collator means 58 collates the received authentication data TKA to determine whether the received data duly matches the data registered in the register means 61. If the authentication data TKA matches the data registered as an up-to-date record or history of issuance of unique authentication data by the subservient computer, the master computer 41 transmits the collated result from its transmitter means 59 to the computer 50 of the second accounting section by way of the accounting department's computer 43.

In this way, the receiver section 64 in the computer 50 of the second accounting section receives the collated unique authentication data TKA. If the collated unique authentication data TKA is judged to be proper data (that has been fairly created and issued by any one of the subservient computers), then the authorizing means 66 in the computer 50 permits further communication with the computer 45 of the first sales section, in response to which the requested accounting-related information is supplied to the computer 45.

If, on the other hand, the collated unique authentication data TKA is judged to be improper data (that has not been fairly created and issued by any one of the subservient computers), then the rejecting means 67 in the computer 50 inhibits further communication with the computer 45 of the first sales section because there is a great likelihood that an unauthorized outsider' computer is pretending to be the computer 45.

With the authentication-data issuing and verifying system in accordance with Example 1 above, each of the computers on the hierarchical network can be authenticated reliably in accordance with data created and issued on the basis of an elapsed time measurement indicated by the unique time generating device provided therein. Thus, it is possible to effectively prevent any third person's computer from unfairly conducting data exchange by pretending to be one of the subservient computers or intruding into the hierarchical network.

Whereas in Example 1 unique authentication data TKA issued by the computer 45 of the first sales section has been described as being transmitted to the master computer 41 by way of the sales department's computer 42, such data may be transferred directly to the master computer 41. Similarly, data to be collated and resultant collated data may be communicated between the master computer 41 and the computer 50 of the second accounting section directly, rather than by way of the accounting department's computer 43.

Further, when the computer 45 of the first sales section desires further access to the computer 50 of the second accounting section in Example 1, the unique authentication data TKA created and issued earlier may be altered by the renewal section 62 on the basis of an elapsed time measurement indicated by the unique time generating device 45A so that further communication is safely made between the two computers 45 and 50 on the basis of the thus altered unique authentication data in a similar manner to the above-described best mode. In this case, the renewal means 57 in the master computer 41 may update the unique authentication data registered in the register means 61 (as recited in appended claims 31 and 32). Also, in such a case, the subservient computers may include a memory means (not shown) for storing the unique authentication data (including the altered unique authentication data) for use in next access. Rather than providing such a memory means in the subservient computers, an alternative arrangement may be made such that the last-issued unique authentication data TKA is read out from register means 61 in the master computer 41 as the computer 45 of the first sales section requests access to the computer 50 of the second accounting section and additional data based on a new elapsed time measurement received from the computer 45 is imparted to the authentication data TKA to thereby create and issue unique authentication data that is updated in both the master and subservient computers.

Moreover, whereas Example 1 has been described as carrying out the further access between the subservient computers on the basis of such updated unique authentication data, unique authentication data may be created and issued, as a so-called one-time password, for each access on the basis of an elapsed time measurement indicated by the unique time generating device provided in the computer requesting the access (as recited in appended claim 9).

Furthermore, in addition to the arrangement of Example 1, the accessed subservient computer may also create and issue unique authentication data via its unique time generating device and transmit the unique authentication data to the accessing computer by way of same procedure as taken for the unique authentication data of the latter computer, so as to permit mutual authentication between the two computers. Moreover, whereas Example 1 has been described in relation to the case where the computers of the individual sections are the lowest-level computers in the company, still-lower-level computers may be connected to the sections' computers for use at various stations or by individual constituent members belonging to the sections and departments (as recited in appended claim 16).

Example 2

Next, the authentication-data issuing and verifying system of the present invention will be described in relation to a case where it is applied to mutual authentication among computers of various banking agencies (as recited in appended claims 10 to 15, 20, 22, 38, 39, etc.) This example assumes that account transfers, settlements of account, etc. between the banking agencies are conducted via the respective computers. Further, in each of the banking agencies, various services to individual customers, such as money changing, loaning, payment into accounts and money withdrawal, are recorded in the computer in association with their account numbers and the like. In Example 2, such various operations between the banking agencies and between the banking agencies and their customers are all executed on the basis of unique authentication data.

Figure 17:
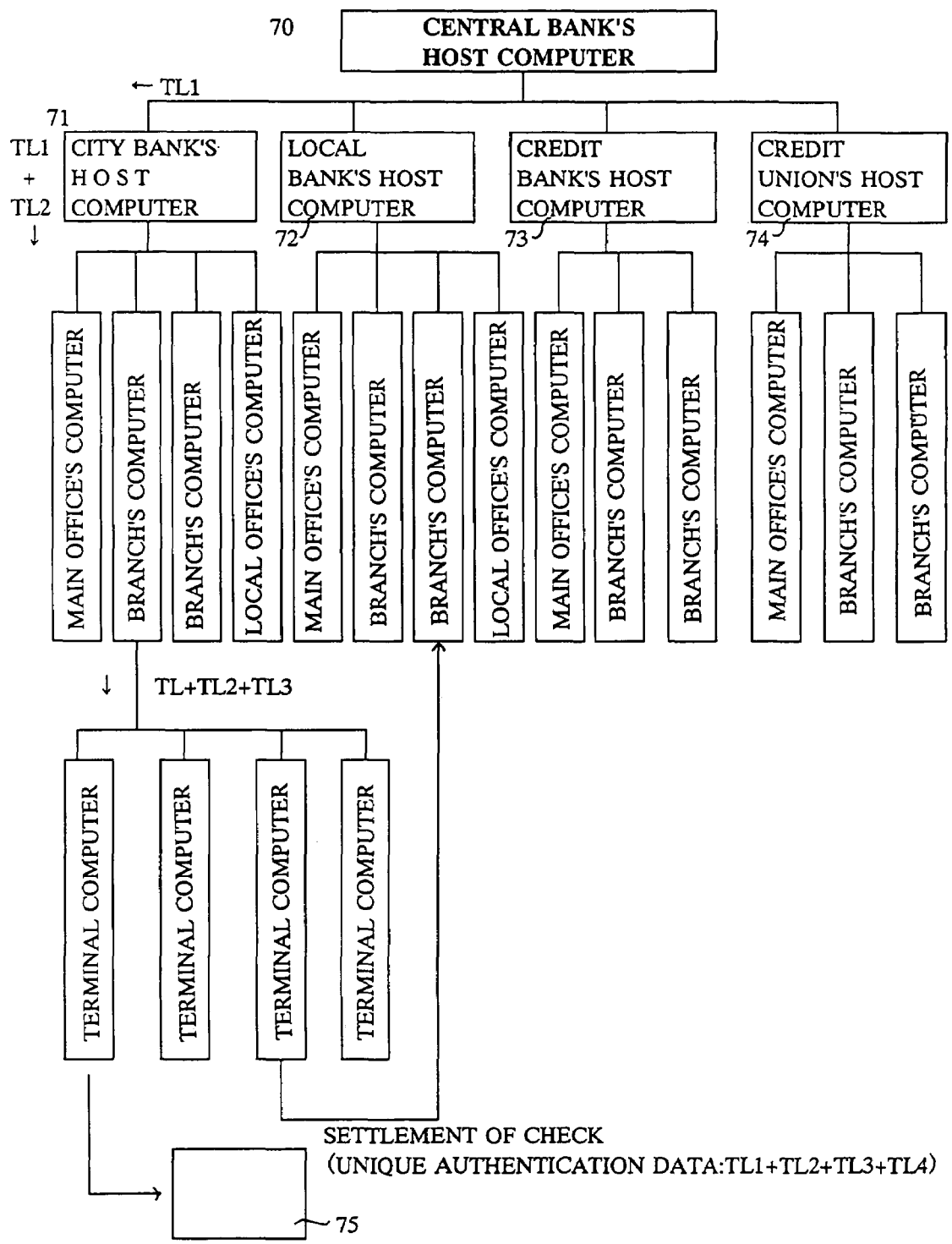
FIG. 17 is a diagram illustrating a hierarchical network of an authentication-data issuing system according to Example 2.

FIG. 17 is a diagram illustrating a hierarchical network of the computers in Example 2, where reference numeral 70 represents a host computer of the central bank (e.g., the Bank of Japan) that functions as a master computer exercising general control of the other computers in the hierarchical network. To the master computer 70 are connected computers of various lower-level or subservient banking agencies, such as host computers 71 of city banks, host computers 72 of local banks, host computers 73 of credit banks and host computers 74 of credit unions for simplicity, only one host computer is shown and will be described for each of the subservient banking agencies. Further, to the computer of each of the banking agencies are connected host computers of main and local offices and branches, actually performing banking operations, of the associated banking agencies. Furthermore, to the host computer of each of the main and local offices and branches are connected computers of on-line terminals (including cash dispensers). In the computers of the central bank down to the on-line terminals, there are provided unique time generating devices, one for each computer, which count time within different time-measuring periods to indicate different elapsed time measurements at every given time point, as described earlier in relation to the above-described best mode. Data relating to the individual unique time generating devices are stored together in a data memory of the host computer 70 of the central bank for general management by the host computer 70, similarly to the arrangement of FIG. 15.

Each of the computers on the hierarchical network is arranged to create and issue unique authentication data in a similar manner to the best mode or Example 1, when conducting, via a given terminal computer, a transaction (such as settlement of a draft or check or remittance) with the computer of another banking agency or another office of the same banking agency. For example, when settlement of a check issued by one of the branches of the local bank 72 is requested thereto via the on-line terminal of one of the branches of the city bank 71, a request for access to the branch of the local bank 72 is sequentially made from the on-line terminal, through the city bank's host computer 71, to the central bank's host computer 70. In response to such a request, the central bank's host computer 70 creates and issues authentication data TL1, representative of authorization of the requested access, on the basis of an elapsed time measurement indicated by the unique time generating device provided in that host computer. Then, the local bank's host computer 71 creates and issues authentication data TL2 on the basis of an elapsed time measurement indicated by its unique time generating device and adds the authentication data TL2 to the authentication data TL1 received from the central bank's host computer 70. Thereafter, the branch's computer creates and issues authentication data TL3 on the basis of an elapsed time measurement indicated by its unique time generating device and adds the authentication data TL3 to the authentication data TL2, and the terminal's computer creates and issues authentication data TL4 on the basis of an elapsed time measurement indicated by its unique time generating device and adds the authentication data TL4 to the authentication data TL3 so as to provide unique authentication data TL1+TL2+TL3+TL4. Thus, the terminal's computer transmits the unique authentication data TL1+TL2+TL3+TL4 to the computer of the local bank's branch as check-settling identification ID along with check settlement information. Prior to the transmission, the issued unique authentication data is sequentially sent to the higher-order computers so that it is registered in register means (not shown) of the branch's and local bank's host computers and ultimately in register means (not shown) of the central bank's host computer 70. The computer of the local bank's branch, having received the check settlement request, reads the unique authentication data TL1+TL2+TL3+TL4 from among the received information and transmits the thus-read data to the higher-order computers so that the data is ultimately collated in the central bank's host computer 70. Specifically, in the central bank's host computer 70, a collator means (not shown) collates the the unique authentication data received from the computer of the local bank's branch in order to ascertain whether the data matches the authentic data registered in the register means. The collated result is transmitted to the lower-order computers so that it is ultimately received by the branch's computer. If the received data is authentic data, the branch's computer initiates procedures necessary for the check settlement on the basis of permission from the authorizing means; otherwise, it refuses to execute the check settlement procedures.

Details of the individual components in the authentication-data issuing and verifying system are similar to those described earlier in relation to Example 1 and will not be described here to avoid unnecessary duplication.

In the case of a relatively continual transaction, such as an account transfer, remittance or debiting, occurring monthly between the banking agencies (including transactions between the branches and between branches and main office of a same banking agency), unique authentication data used in the last transaction may be updated, as in Example 1, for used in a next transaction. To this end, it is only necessary that authentication data be transmitted from the master computer to the lower-order computers while being imparted unique additional data in each of the lower-order computers so that the lowest-level (terminal) computer creates and issues updated unique authentication data on the basis of the received authentication data, similarly to the unique authentication data creating procedures of FIG. 17. Registration and verification of such updated unique authentication data are performed in a similar manner to the above-described best mode, Example 1 or modifications (as recited in appended claims 27 to 31) and will not be described here to avoid unnecessary duplication.

Although the updated unique authentication data can be generated by updating the last unique authentication data registered in a renewal means (not shown) of the master computer (host computer 70 of the central bank), a similar renewal means may also be provided in each of the lower-order computers to update the content of the unique authentication data stored in the register means of the lower-order computer (as recited in appended claims 32 and 34). In such a case, the renewal means of each of the lower-order computers may retrieve the updated authentication data registered in the highest level computer of the central bank to thereby update the last unique authentication data stored in the register means of the lower-order computer (as recited in appended claim 33).

Further, in the example of FIG. 17, each of the banking agencies uses unique authentication data not only in transactions with other banking agencies but also in direct transactions with their customers. Each of the customers normally holds one or more cards 75 (such as a cash card and credit card) associated with his or her account opened at the banking agency, and it is expected that in the near future the customers will also hold electronic money cards (so-called "electronic money") issued by their banking agencies. Normally, magnetic or IC cards used as such money-equivalent cards are issued via the terminal computers as shown in FIG. 17, at which time unique authentication data is created, for each of the cards, in accordance with elapsed time measurements indicated by the individual unique time generating devices on the basis of original authentication data that is passed from the central bank's computer 70 to the lower-order computers while being imparted additional data in each of the lower-order computers and the thus-created time unique authentication data is recorded onto the card along with other information such as account information (including information on the current balance) and credit information (including information on the maximum limit of loan). Each time the thus-issued card 75 is used in the terminal computer of a selected banking agency to execute any one of various transactions, such as payment into account, money changing, money withdrawal from deposits and savings, deposit of money and inquiry of the current remaining balance, the unique authentication data is collated and updated in the master computer 70 (or in any of the lower-order computers). Further, for the electronic money cards which are expected to be widely used in the near future, terminal machines (terminal computers) will be installed in shops, department stores, etc. and connected to the network as shown in FIG. 17, and the unique authentication data on the card 75 will be collated and renewed each time it is put to actual use. As a consequence, the money amount in the account corresponding to the card 75 is updated, i.e., increased or decreased, so that various data are created including the up-to-date record of use of the card 75.

With such an arrangement, theft of the recorded data on the card 75 will end in meaningless effort because the recorded data are automatically altered immediately when the card is put to use.

Further, even in a transaction between the central bank and any one of the subservient banking agencies (such as supply of money, particularly that of electronic money, or inquiry or report between the two), reliable authentication is permitted by creating and issuing unique authentication data to carry out necessary procedures on the thus-issued data. Especially, this arrangement allows the central bank's computer to readily know a total money supply (particularly, that of electronic money), so that the monetary policy of the central bank can be properly managed via its host computer 70. Other arrangements and operation of the example are similar to those of the above-described best mode, example 1 or modifications and will not be described here to avoid unnecessary duplication.

Example 3

Figure 18:
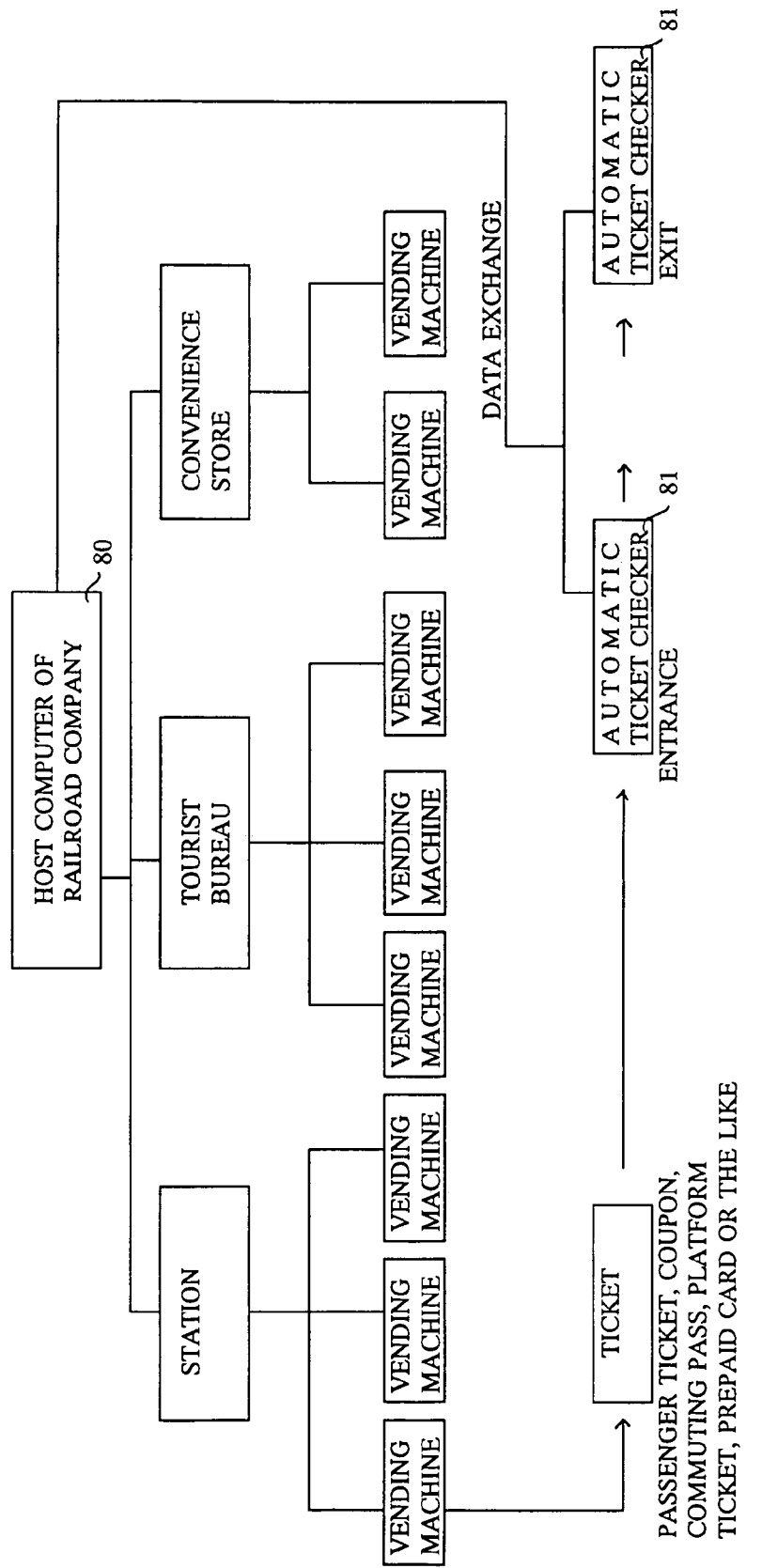
FIG. 18 is a diagram illustrating a hierarchical network of an authentication-data issuing system according to Example 3.

FIG. 18 is a diagram showing a hierarchical network structure where the authentication-data issuing and verifying system is provided in each of a plurality of computers owned by a railroad company (as recited in appended claims 18, 19, 38, 39, etc.). In the illustrated example, reference numeral 80 represents a host computer of the railroad company, to which are connected subservient computers of individual stations, tourist bureaus and convenience stores—only one station, tourist bureau and convenience store are shown and will be described for simplicity—that control issuance of railroad tickets. To each of the subservient computers are connected computers contained in or attached to ticket vending machines that issue various tickets with magnetic data recorded thereon, such as ordinary railroad passenger tickets, coupon tickets, commuter passes and platform tickets, as well as prepaid (magnetic) cards for utilizing the railroad facilities. The host computer 80 of the railroad company is also connected with computers of automatic ticket checkers 81 that are placed at the ticket gates of the individual railroad stations to read information recorded on the prepaid cards and tickets. In this example, a unique time generating device is provided in each of the host computer 80 of the railroad company, computers of the station, tourist bureaus and convenience store and computers of the lowest-level vending machines and ticket checkers 81. Thus, unique authentication data, created and issued by the unique time generating devices on the basis of unique elapsed time measurements in a similar manner to Example 2 above, will be recorded, along with railroad service information indicative of a travel section, type and No. of a reserved seat, term of validity, etc.), onto each of the tickets and prepaid cards sold via the vending machines. To this end, each of the computers of the vending machines and ticket checkers 81 is provided with a reader/writer which reads and write data on the tickets and prepaid cards.

The tickets and prepaid cards issued via the vending machines can be used to pass through the automatic ticket checkers and the prepaid cards can be used to purchase tickets from the vending machines, during which time the unique authentication data recorded on each of these tickets and prepaid cards is read via the reader/writer and then transmitted to the host computer 80 of the railroad company for the subsequent collation. Namely, the host computer 80 collates the received unique authentication data with previously registered data in the register means and then sends the collated result to the ticket checker 81 or vending machine in which the ticket or prepaid card has been inserted. The ticket checker 81 or vending machine, having received the collated result, permits the use of the ticket or prepaid card if the ticket or prepaid card has been determined as authentic, but otherwise it rejects the use of the ticket or prepaid card. Each of the tickets and prepaid cards thus accepted is subjected to necessary rewriting or updating of the recorded railroad service information and the unique authentication data on the basis of authentication data and the like imparted by the higher-order computers in a similar manner to the above-described best mode and examples. The updated data are sent to the host computer 80 of the railroad company to update the previously registered unique authentication data in the register means thereof. For tickets having a specific term of validity, such as commuter passes and platform tickets, the recorded data may be automatically erased via the register means upon expiration of the term.

Such a system for issuing and authenticating tickets and prepaid cards can of course be applied to other transportation companies than railroad companies, such as airline companies, shipping companies and bus companies. In every such application, it is only necessary that information indicative of the shipping, airline or bus services be recorded on the ticket or prepaid card along with the unique authentication data. Possible examples of the ticket and prepaid card for use with the present inventive system include cards and tickets for amusement parks, lottery tickets and gift certificates issued by department stores, tickets for various recreational facilities, and tickets for automatic vending machines. In every such case, each amount due is subtracted from the money amount (current balance) recorded on the card or ticket and simultaneously the unique authentication data is updated to thereby prevent unfair or unauthorized use of the card or ticket.

Example 4

Figure 19:
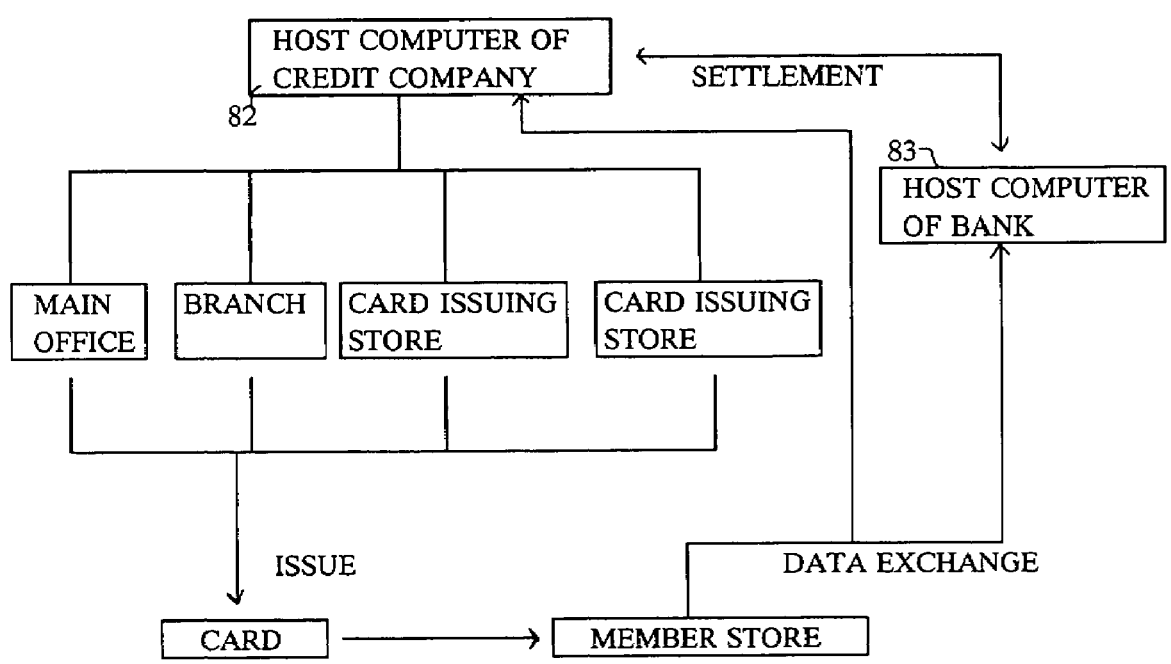
FIG. 19 is a diagram illustrating a hierarchical network of an authentication-data issuing system according to Example 4.

The identification data issuing and verifying system in accordance with the present invention is also applicable to various other types of transaction card, such as cards issued by credit companies, securities companies, insurance companies, loan companies and trust companies. For example, each card issued by a credit company, as shown in FIG. 19, on the basis of information on the customer's credit standing can be used in every member store of the credit company, and the unique authentication data recorded on the card is of course updated each time the card is used. Further, information on every transaction in the member store is sent, along with the unique authentication data, to a host computer 83 of an associated bank as well as a host computer 82 of the credit company, so that necessary settlement procedures can be performed between the host computers of the bank and credit company on the basis of the unique authentication data.

Example 5

The authentication-data issuing and verifying system in accordance with the present invention is applicable to computers used by an administrative organ (as recited in appended claim 17) as well as companies and other profit-making and non-profit-making organizations as described earlier in relation to Example 1. Namely, in Example 5, a host computer of the administrative organ is set to function as a master computer, and the other computers used at various stations and by constituent members of the organ are made to function as lower-level computers subservient to the master computer. Access between these computers within the administrative organ is carried out on the basis of unique authentication data similarly to the best mode, examples and modifications as described above.

Figure 20:
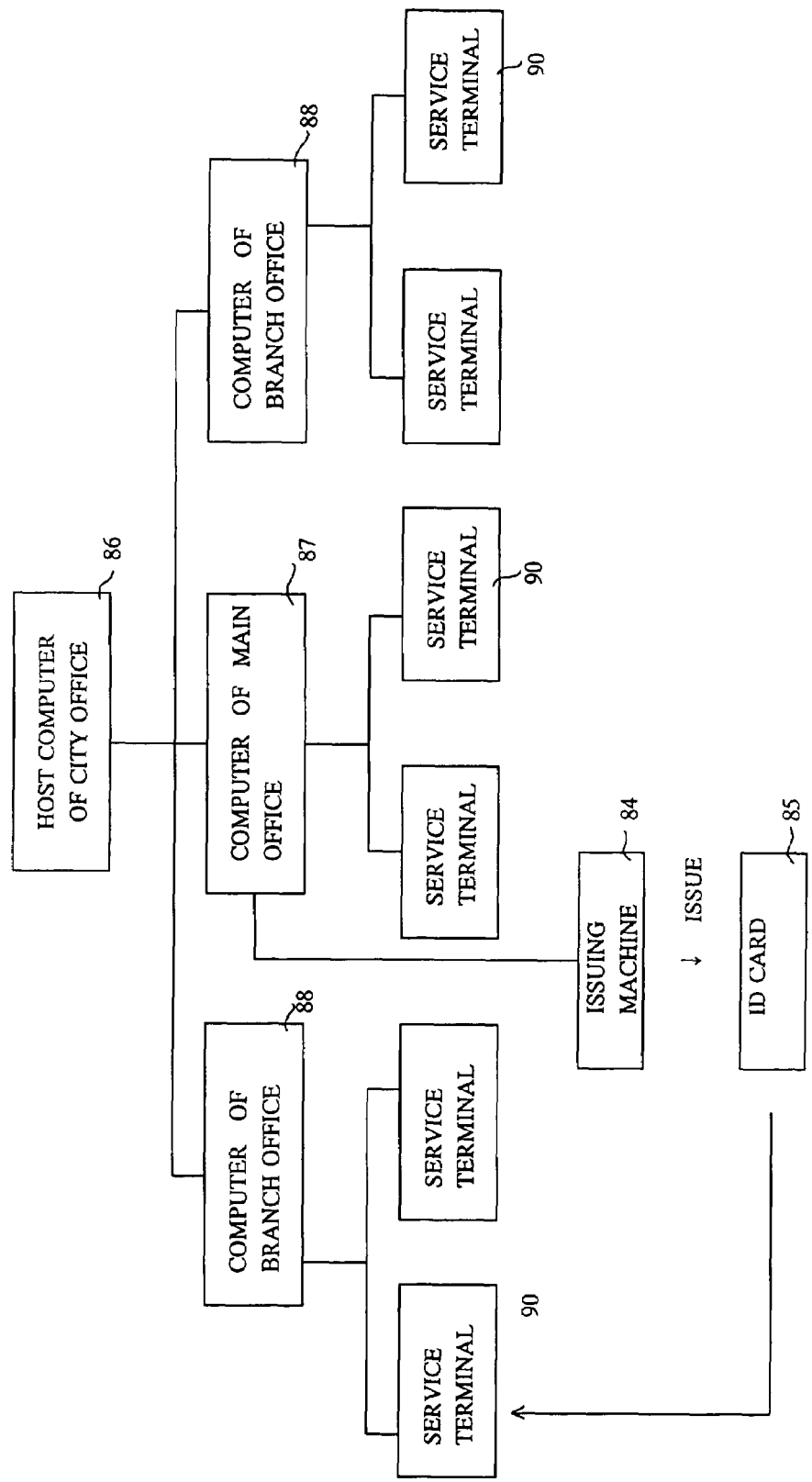
FIG. 20 is a diagram illustrating a hierarchical network of an authentication-data issuing system according to Example 5.

The administrative organ, as shown in FIG. 20, supplies residents with ID cards 85 issued via a card issuing machine 84. At that time, the issuing machine 84 may record unique authentication data created on the basis of respective authentication data transmitted thereto from the host computer 86 and the computer 87 of a main office 86 and added together one after another (as recited in appended claims 11 and 38). Increased efficiency of the administrative management may be achieved by allowing the residents to get their desired service using the thus-issued ID cards 85 on terminal machines 90 positioned in the main, branch or local office of the administrative organ. In these cases, unfair use of the ID cards by unauthorized persons can be effectively prevented because the unique authentication data recorded on each of the cards is updated immediately every time the card is used on the terminal machine 90.

Whereas the best mode, examples and modifications have been described above mainly in relation to magnetic-type prepaid cards and cash cards, ID cards, etc., the principle of the present invention may also be applied to various other storage media, such as floppy disk and writable CD-ROM. Where the present invention is applied to an IC card, it is possible to incorporate in the IC card a unique time generating device operating on the basis of data received from a higher-level computer, because the IC card can itself contain an electric cell. Further, by attaching the IC card to a handy-type personal computer for connection to communication lines, the computer can work as a lowest-level computer in the hierarchical network structure.

Moreover, whereas the best mode and examples have been described above as communicating the level-specific authentication data and the ultimate unique authentication data with no particular modification made thereto, it is preferable to encrypt these data via an encoder device. Particularly, it is desirable that these data be appropriately protected from being significantly influenced in a direct manner by a lower-level computer and that the unique time generating devices and their behavior remain invisible.

INDUSTRIAL APPLICABILITY

With the present invention having been described so far, authentication of any one of a plurality of computers interconnected via communication lines or mutual authentication between the computers can be performed with greatly increased accuracy. It is also possible to more accurately authenticate a recording media storing thereon authentication data issued from any of the computers. Further, because the unique authentication data is created and issued or updated or altered every time the recording media having the data stored thereon is put to actual use, the present invention can always grantee a secure transaction even when the unique authentication data is leaked to any third person. Thus, the present invention will find a variety of applications, such as authentication of various money-equivalent transaction instruments such as prepaid cards and cash cards, authentication of tickets, coupon tickets and electronic money, authentication of personalized ID cards, and computer-based authentication between companies, between banking agencies and between administrative organs.

The invention claimed is:

1. An authentication-data issuing system based on unique time, said authentication-data issuing system including a plurality of computers connected with each other via communication lines with one of said computers set to function as a master computer, said master computer comprising:

a unique time generating device including time keeping means for sequentially outputting unit time values at predetermined intervals over a preset time-measuring period that begins at a given start point on a selected date and terminates at a given future end point and accumulating means for sequentially accumulating said unit time values output by said time keeping means so as to constantly measure a changing elapsed time within the time-measuring period;

transmitter means for, during communication between said master computer and another of the computers subservient to said master computer, transmitting, from said master computer to the subservient computer, authentication data based on an elapsed time measurement, corresponding to a given time point, indicated by said unique time generating device; and register means for receiving and registering an issuance history of unique authentication data created and issued by said subservient computer imparting additional data, unique to said subservient computer, to the authentication data transmitted by said master computer.

2. An authentication-data issuing system as recited in claim 1 wherein said master computer includes storage means for storing data on said unique time generating device of each of the subservient computers which include data indicative of the time-measuring period of said unique time generating device, or data on attributes of said unique time generating devices of said master computer and each of said subservient computers, or unique additional data to be imparted, by each of said subservient computers, to the authentication data received from said master computer.

3. An authentication-data issuing system as recited in claim 1 wherein the unique authentication data created and issued by each of said subservient computers is transmitted to and used by one or more other subservient computers under control of said master computer every time a transaction involving use of the unique authentication data is performed.

4. An authentication-data issuing system as recited in claim 1 wherein the unique authentication data created and issued by each of said subservient computers includes transmitted information to be transmitted to one or more other subservient computers under control of said master computer, said transmitted information including any of information representative of nature of a transaction, merchandise, settlement of account and credit standing.

5. A recording media having stored thereon unique authentication data created by any one of said subservient computers as recited in claim 1 said recording media being issued by said subservient computer.

6. A recording media as recited in claim 5 which comprises a floppy disk, IC card, magnetic card or writable CD-ROM.

7. A recording media as recited in claim 5 where the unique authentication data stored thereon includes any of monetary information, information on credit loan, money information indicative of a current balance of deposit or saving in a particular account, and information indicative of permission or refusal of use of an amusement part, game house, recreational facility, a railroad, bus, ship, airplane, telephone, facsimile, automatic vending machine or the like.

8. A recording media as recited in claim 5 wherein said matter computer is a host computer of a transportation company exercising general control of operations for issuing tickets including an ordinary passenger ticket, railroad and ship tickets, coupon ticket, commuter pass and airline ticket and said subservient computers are computers contained in vending machines installed in a station, airlines, shipping company, tourist bureau, convenience store and the like, said recording media being employed as the ticket issued by any one of the vending machines and having stored thereon unique authentication data that is created by said subservient computer of the vending machine every time the ticket is used.

9. A recording media as recited in claim 5 wherein said matter computer is a host computer exercising general control of operations for issuing prepaid cards for using a railroad, ship, airplane, pachinko game machine, telephone, amusement park and the like and said subservient computers are computers contained in vending machines for issuing the prepaid cards, said recording media being employed as the prepaid card issued by any one of the vending machines and having stored thereon unique authentication data that is created by said subservient computer of the vending machine every time the ticket is used.

10. A recording media as recited in claim 5 wherein said matter computer is a host computer of a central bank exercising general control of operations for issuing electronic money and said subservient computers are computers contained in money issuing machines for issuing electronic money to users, said recording media being employed as the electronic money issued by any one of the money issuing machines and having stored thereon unique authentication data that is created by said subservient computer of the money issuing machine every time the electronic money is used.

11. A recording media as recited in claim 5 wherein said matter computer is a host computer of an administrative organ exercising general control of public services to be provided to individual residents and said subservient computers are computers contained in card issuing machines for issuing personalized ID cards that are to be used by the individual residents to get the public services, said recording media being employed as the ID card issued by any one of the card issuing machines and having stored thereon unique authentication data that is created by said subservient computer of the vending machine every time the ID card is used.

12. A recording media as recited in claim 5 wherein said matter computer is a host computer exercising general control of operations of a banking agency, credit company, securities company, insurance company, loan company and trust company issuing cards including a cash card, loan card and credit card and said subservient computers are computers contained in card issuing machines for issuing cards to individual customers, and which is employed as said card issued by any one of the card issuing machines and has stored thereon in magnetic form unique authentication data that is created by said subservient computer of the money issuing machine every time the card is used.

13. An authentication-data issuing system as recited in claim 1 wherein said master computer is a host computer of a central bank exercising general control of banking operations and said subservient computers are computers of banking agencies including city banks, local banks and credit banks under control of the host computer of the central bank, and wherein a transaction including money supply, settlement, loaning, money changing or payment into account, between any one of the banking agencies and a customer is performed on the basis of unique authentication data created and issued for each transaction.

14. An authentication-data issuing system as recited in claim 13 wherein the unique authentication data created and issued by said subservient computer contains the unique authentication data updated by renewal means.

15. An authentication-data issuing system as recited in claim 1 wherein said master computer is a host computer of a main office of a banking agency exercising general control of a plurality of branches, local offices and the like of the banking agency and said subservient computers are computers installed in the main office, branches and local offices of the banking agency, and wherein a transaction including money supply, settlement, loaning, money changing or payment into account, between any one of the subservient computers and a customer is performed on the basis of unique authentication data created and issued for each transaction.

16. An authentication-data issuing system as recited in claim 1 wherein said matter computer is a host computer of a main office exercising general control of an organization including a company or corporation and said subservient computers are computers for use at stations or by constituent members of the organization, and wherein an operation to be effected by each of the stations or constituent members is performed on the basis of unique authentication data created and issued by the corresponding subservient computer for each operation.

17. An authentication-data issuing system as recited in claim 1 wherein said matter computer is a host computer of an administrative organ exercising general control of administrative affairs and said subservient computers are computers for use at stations or by constituent members of the administrative organ, and wherein an operation to be effected by each of the stations or constituent members is performed on the basis of unique authentication data created and issued by the corresponding subservient computer for each operation.

18. An authentication-data issuing system based on unique time, said authentication-data issuing system including a plurality of computers connected with each other via communication lines with one of said computers set to function as a master computer, said master computer including a unique time generating device including time keeping means for sequentially outputting unit time values at predetermined intervals over a preset time-measuring period that begins at a given start point on a selected date and terminates at a given future end point and accumulating means for sequentially accumulating said unit time values output by said time keeping means so as to constantly measure a changing elapsed time within the time-measuring period, each of the computers subservient to said master computer comprising:
receiver means for, during communication with said master computer, receiving authentication data based on an elapsed time measurement, corresponding to a given time point, indicated by said unique time generating device of said master computer;
issuer means for creating and issuing unique authentication data by imparting additional data, unique to said subservient computer, to the authentication data received via said receiver means from said master computer; and
transmitter means for transmitting, to said master computer, an issuance history of the unique authentication data created and issued by said issuer means.

19. An authentication-data issuing system as recited in claim 18 wherein said issuer means in each of the subservient computers includes imparting means for imparting the additional data, unique to said subservient computer, to the received authentication data, and said imparting means includes a unique time generating device that includes time keeping means for sequentially outputting unit time values at predetermined intervals over a preset time-measuring period that begins at a given start point on a selected date and terminates at a given future end point and accumulating means for sequentially accumulating said unit time values output by said time keeping means so as to constantly measure a changing elapsed time within the time-measuring period, and
wherein said unique time generating device in said imparting means indicates elapsed time measurements over the time-measuring period that is different from the time-measuring periods of the unique time generating devices provided in said master computer and other subservient computers and creates and issues unique authentication data peculiar to said subservient computer.

20. An authentication-data issuing system as recited in claim 19 wherein said master computer functions as an original supplier of unique time to said subservient computers so that said unique time generating devices of said subservient computers are activated to indicate elapsed time measurements within their respective preset time-measuring periods different from each other.

21. An authentication-data issuing system as recited in claim 19 wherein said master computer functions as an original supplier of unique time to said subservient computers so that said unique time generating devices of said subservient computers are activated to indicate elapsed time measurements within their respective preset time-measuring periods different from each other, and each of the computers that are immediately subservient to said master computer is a second-level computer that functions as a secondary supplier of unique time data to third-level computers subservient to said second-level computer so that the unique time generating devices of said third-level computers are activated to indicate elapsed time measurements within their respective preset time-measuring periods different from each other.

22. An authentication-data issuing system based on unique time, said authentication-data issuing system including a plurality of computers connected with each other via communication lines with one of said computers set to function as a master computer, each of the computers subservient to said master computer comprising:
a unique time generating device including time keeping means for sequentially outputting unit time values at predetermined intervals over a preset time-measuring period unique to said subservient computer that begins at a given start point on a selected date and terminates at a given future end point and accumulating means for sequentially accumulating said unit time values output by said time keeping means so as to constantly measure a changing elapsed time within the time-measuring period;

issuer means for creating and issuing unique authentication data, peculiar to said subservient computer, on the basis of an elapsed time measurement indicated by said unique time generating device; and transmitter means for transmitting, to said master computer, an issuance history of the unique authentication data created and issued by said issuer means.

23. An authentication-data issuing system based on unique time, said authentication-data issuing system including a plurality of computers connected with each other via communication lines with one of said computers set to function as a master computer, each of the computers subservient to said master computer comprising a unique time generating device including time keeping means for sequentially outputting unit time values at predetermined intervals over a preset time-measuring period unique to said computer that begins at a given start point on a selected date and terminates at a given future end point and accumulating means for sequentially accumulating said unit time values output by said time keeping means so as to constantly measure a changing elapsed time within the time-measuring period, said master computer, exercising general control of the subservient computers, including register means for receiving and registering an issuance history of data created and issued by each of said subservient computers on the basis of an elapsed time measurement indicated by said unique time generating device of said subservient computer.

24. An authentication-data verifying system including a plurality of computers connected with each other via communication lines with one of said computers set to function as a master computer, each of the computers subservient to said master computer comprising:

reading means for reading unique authentication data issued by any one of the subservient computers on the basis of information received from another of the subservient computers, or reading unique authentication data issued by any one of the subservient computers and recorded on a recording media;

transmitter means for transmitting the unique authentication data read by said reading means to said master computer for subsequent collation thereby; and receiver means for receiving from said master computer a result of collation between an issuance history of the unique authentication data by each of said subservient computers registered in said master computer and the unique authentication data transmitted by said transmitter means.

25. An authentication-data verifying system as recited in claim 24 wherein each of said subservient computers includes rejecting means which when a result of the collation by said collator means of said master computer indicates that the unique authentication data read by said reading means is not present in the issuance history, rejects subsequent access between said subservient computer and another of said subservient computers or rejects use, in said subservient computer, of a recording media having stored thereon the unique authentication data.

26. An authentication-data verifying system as recited in claim 24 wherein each of said subservient computers includes authorizing means which when a result of the collation by said collator means of said master computer indicates that the unique authentication data read by said reading means is present in the issuance history, authorizes subsequent access between said subservient computer and another of said subservient computers or authorizes use, in said subservient computer, of a recording media having stored thereon the unique authentication data.

27. An authentication-data issuing system based on unique time, said authentication-data issuing system including a plurality of computers connected with each other via communication lines with one of said computers set to function as a master computer, each of the computers subservient to said master computer being accessed by another of the subservient computers on the basis of unique authentication data authorized by said authorizing means recited in claim 26 or being connected with a recording media, having stored thereon the unique authentication data whose use is permitted by said authorizing means recited in claim 26, said master computer comprising a unique time generating device including time keeping means provided in said master computer for sequentially outputting unit time values at predetermined intervals over a preset time-measuring period that begins at a given start point on a selected date and terminates at a given future end point and accumulating means for sequentially accumulating said unit time values output by said time keeping means so as to constantly measure a changing elapsed time within the time-measuring period, each of said subservient computers comprising: receiver means for, during communication with said master computer, receiving authentication data based on an elapsed time measurement, corresponding to a given time point, indicated by said unique time generating device;

issuer means for creating and issuing unique authentication data by imparting additional data, unique to said subservient computer, to the authentication data received via said receiver means; and transmitter means for transmitting, to said master computer, the unique authentication data created and issued by said issuer means.

28. An authentication-data issuing system as recited in claim 27 wherein said issuer means in each of said subservient computers includes imparting means for imparting, to the received authentication data, the additional data unique to said subservient computer, and said imparting means includes a unique time generating device that includes time keeping means for sequentially outputting unit time values at predetermined intervals over a preset time-measuring period that begins at a given start point on a selected date and terminates at a given future end point and accumulating means for sequentially accumulating said unit time values output by said time keeping means so as to constantly measure a changing elapsed time within the time-measuring period, and wherein said unique time generating device in said imparting means indicates elapsed time measurements over a time-measuring period that is different from time-measuring periods of the unique time generating devices provided in said master computer and other subservient computers and creates and issues unique authentication data peculiar to said subservient computer.

29. An authentication-data issuing system based on unique time, said authentication-data issuing system including a plurality of computers connected with each other via communication lines with one of said computers set to function as a master computer, each of the computers subservient to said master computer being accessed by another of the subservient computers on the basis of unique authentication data authorized by said authorizing means recited in claim 26 or being connected with a recording media, having stored thereon unique authentication data whose use is authorized by said authorizing means recited in claim 26, each of said subservient computers comprising:

a unique time generating device for sequentially outputting unit time values at predetermined intervals over a preset time-measuring period that begins at a given start point on a selected date and terminates at a given future end point and accumulating means for sequentially accumulating said unit time values output by said time keeping means so as to constantly measure a changing elapsed time within the time-measuring period;

issuer means for creating and issuing unique-authentication-data updating data, corresponding to the authorized unique authentication data, on the basis of an elapsed time measurement indicated by said unique time generating device; and transmitter means for transmitting, to said master computer, the unique-authentication-data updating created and issued by said issuer means.

30. An authentication-data issuing system based on unique time, said authentication-data issuing system including a plurality of computers connected with each other via communication lines with one of said computers set to function as a master computer, each of the computers subservient to said master computer being accessed by another of the subservient computers on the basis of unique authentication data authorized by said authorizing means recited in claim 26 or being connected with a recording media, having stored thereon unique authentication data whose use is authorized by said authorizing means recited in claim 26, said master computer comprising:

a unique time generating device including time keeping means for sequentially outputting unit time values at predetermined intervals over a preset time-measuring period that begins at a given start point on a selected date and terminates at a given future end point and accumulating means for sequentially accumulating said unit time values output by said time keeping means so as to constantly measure a changing elapsed time within the time-measuring period;

transmitter means for transmitting to, any one of the subservient computers, authentication data based on an elapsed time measurement, corresponding to a given time point, indicated by said unique time generating device; and renewal means for receiving unique-authentication-data updating data that is created and issued by the subservient computer imparting additional data, unique to the subservient computer, to the authentication data from said transmitter means of said master computer, and altering the unique authentication data on the basis of the received unique-authentication-data updating data to thereby update an issuance history of the unique authentication data by said subservient computer that is registered in said master computer.

31. An authentication-data issuing system as recited in claim 30 wherein said subservient computer includes renewal means for altering the unique authentication data used to gain authorization to access another of the computers or to make use of the recording media, on the basis of the unique-authentication-data updating data.

32. An authentication-data issuing system as recited in claim 31 wherein said renewal means of said subservient computer receives data relating to the issuance history updated by said renewal means of said master computer, said subservient computer updating the unique authentication data on the basis of the received data relating to the issuance history.

33. An authentication-data issuing system as recited in claim 31 wherein the unique authentication data updated by said renewal means is stored in memory of the subservient computer, having accessed using last-issued unique authentication data, so that the updated unique authentication data is used for next access to another of the subservient computers.

34. An authentication-data issuing system as recited in claim 31 wherein said renewal means alters last-issued unique authentication data, stored on the recording media used in said subservient computer, on the basis of the created and issued unique-authentication-data updating data.

35. A recording media having stored thereon unique authentication data updated by the unique-authentication-data updating data created and issued in claim 34.

36. An authentication-data issuing system as recited in claim 35 wherein the recording media having stored thereon updated unique authentication data is a ticket, a prepaid card, an electronic money, an ID card, or a card, and wherein the subservient computer that stores the updated unique authentication data on said recording media is contained in or attached to an automatic ticket checker or a card reader/writer for the prepaid card, the ID card or the electronic money.

37. An authentication-data issuing system based on unique time or recording media issued by said authentication-data issuing system as recited in claim 36 wherein the recording media used in said subservient computer is a ticket, electronic money, prepaid card or other card, and wherein information indicative of a current balance calculated by subtracting, from a money amount stored on said recording media, a money amount spent at the time of creation of the updated unique authentication data.

38. An authentication-data issuing system based on unique time, said authentication-data issuing system including a plurality of computers connected with each other via communication lines with one of said computers set to function as a master computer, each of the computers subservient to said master computer being accessed by another of the subservient computers on the basis of unique authentication data permitted by said authorizing means recited in claim 26 or being connected with a recording media, having stored thereon the unique authentication data whose use is permitted by said authorizing means recited in claim 26, said subservient computer including a unique time generating device which includes time keeping means for sequentially outputting unit time values at predetermined intervals over a preset time-measuring period that begins at a given start point on a selected date and terminates at a given future end point and accumulating means for sequentially accumulating said unit time values output by said time keeping means so as to constantly measure a changing elapsed time within the time-measuring period, said master computer including renewal means for receiving unique-authentication-data updating data that is created and issued by the subservient computer in correspondence with the authorized unique authentication data and altering the unique authentication data on the basis of the received unique-authentication-data updating data to thereby update an issuance history of the unique authentication data by said subservient computer that is registered in said master computer.

39. An authentication-data verifying system including a plurality of computers connected with each other via communication lines with one of said computers set to function as a master computer, said master computer comprising:

receiver means for receiving unique authentication data transmitted by transmitter means of any one of the computers subservient to said master computer, said unique authentication data being issued by the subservient computer and read by reading means of the subservient computer; and collator means for collating between the unique authentication data received by said receiver means and an issuance history of the unique authentication data by each of said subservient computers that is registered in said master computer; and transmitter means for transmitting a result of collation by said collator means to receiver means of the subservient computer.

\* \* \* \* \*